US012776082B2

(12) United States Patent
Lin et al.

(10) Patent No.: US 12,776,082 B2
(45) Date of Patent: Oct. 27, 2026

(54) MEAN-SHIFT NORMALIZATION FOR IMAGE PROCESSING

(71) Applicant: ADOBE INC., San Jose, CA (US)

(72) Inventors: Zhe Lin, Clyde Hill, WA (US); Yuqian Zhou, Redmond, WA (US); Krishna Kumar Singh, San Jose, CA (US)

(73) Assignee: ADOBE INC., San Jose, CA (US)

( * ) Notice: Subject to any disclaimer, the term of this patent is extended or adjusted under 35 U.S.C. 154(b) by 110 days.

(21) Appl. No.: 18/806,950

(22) Filed: Aug. 16, 2024

(65) Prior Publication Data

US 2026/0051091 A1 Feb. 19, 2026

(51) Int. Cl.
*G06T 11/60* (2026.01)
*G06T 5/60* (2024.01)
*G06T 5/70* (2024.01)

(52) U.S. Cl.
CPC ................ *G06T 11/60* (2013.01); *G06T 5/60* (2024.01); *G06T 5/70* (2024.01); *G06T 2200/24* (2013.01); *G06T 2207/20081* (2013.01); *G06T 2207/20084* (2013.01)

(58) Field of Classification Search
CPC .............. G06T 11/60; G06T 5/60; G06T 5/70
See application file for complete search history.

(56) References Cited

U.S. PATENT DOCUMENTS 10,942,239 B2 * 3/2021 Le Bihan ......... G01R 33/56341
11,398,255 B1 * 7/2022 Mann ..................... G06N 3/088
12,205,197 B1 * 1/2025 Voroninski .............. G06T 11/10
2001/0009590 A1 * 7/2001 Holm .................. H04N 1/4072 348/E9.037
2012/0092329 A1 * 4/2012 Koo ....................... G06V 20/63 345/419
2014/0037222 A1 * 2/2014 Choudhury ............... G06T 5/70 382/235
2014/0139519 A1 * 5/2014 Mit ......................... G06T 11/00 345/419
2014/0189476 A1 * 7/2014 Berthelot .............. G06F 40/106 715/202
2017/0109930 A1 * 4/2017 Holzer .................... G06T 13/20
2018/0365820 A1 * 12/2018 Nipe ...................... G06V 20/10
2019/0370963 A1 * 12/2019 Chiu ......................... G06T 5/40
(Continued)

OTHER PUBLICATIONS

Park et al.; Semantic Image Synthesis with Spatially-Adaptive Normalization, 2019, pp. 1-10 (Year: 2019).*
(Continued)

*Primary Examiner* — Peter D Le
(74) *Attorney, Agent, or Firm* — F. CHAU & ASSOCIATES, LLC

(57) ABSTRACT

A method, apparatus, non-transitory computer readable medium, and system for image generation includes obtaining an input image and an input prompt. In some cases, the input image depicts a scene and the input prompt indicates a target element to be added to the scene. The image generation model generates a normalized output based on the input image and the input prompt by performing a channel shift on a preliminary output of the image generation model. A synthetic image is generated including the scene of the input image and the target element of the input prompt that is harmonized with the scene.

20 Claims, 14 Drawing Sheets

(56) References Cited

U.S. PATENT DOCUMENTS

| | | | | |
|---|---|---|---|---|
| 2020/0250398 | A1* | 8/2020 | Courtiol | G06V 10/82 |
| 2021/0042724 | A1* | 2/2021 | Rathod | G06F 16/535 |
| 2022/0028043 | A1* | 1/2022 | Zhong | G06T 5/40 |
| 2022/0070236 | A1* | 3/2022 | Yerli | H04L 63/0861 |
| 2022/0222532 | A1* | 7/2022 | Shu | G06T 5/75 |
| 2024/0211731 | A1* | 6/2024 | Pronovost | G05B 19/4069 |
| 2024/0249446 | A1* | 7/2024 | Atzmon | G06T 11/00 |
| 2024/0386621 | A1* | 11/2024 | Zhang | G06V 10/761 |
| 2024/0412428 | A1* | 12/2024 | He | G06F 40/40 |
| 2025/0295371 | A1* | 9/2025 | Wolz | A61B 6/583 |
| 2025/0371348 | A1* | 12/2025 | Xie | G06N 3/08 |
| 2025/0373846 | A1* | 12/2025 | Astola | H04N 19/11 |

OTHER PUBLICATIONS

Lin, et al., "Common Diffusion Noise Schedules and Sample Steps are Flawed." arXiv preprint arXiv:2305.08891v4 [cs.CV] Jan. 23, 2024, 8 pages.

Huang, et al., "Arbitrary Style Transfer in Real-Time with Adaptive Instance Normalization", arXiv preprint arXiv:1703.06868v2 [cs. CV] Jul. 30, 2017, 11 pages.

* cited by examiner

MEAN-SHIFT NORMALIZATION FOR IMAGE PROCESSING

BACKGROUND

The following relates generally to machine learning, and more specifically to image processing using a machine learning model. Machine learning algorithms build a model based on sample data, known as training data, to make a prediction or a decision in response to an input without being explicitly programmed to do so. One area of application for machine learning is image generation.

For example, a machine learning model can be trained to predict features for an image in response to an input prompt, and to then generate or modify the image based on the predicted features. In some cases, the prompt can be used to execute complex image manipulation and compositing. Such image generation provides for a user to edit an image and generate an image with desired features and therefore makes image generation easy for a layperson.

SUMMARY

Embodiments of the present disclosure provide an image processing system that includes an image generation model for performing a harmonization of an image for an inpainting or an outpainting task. In some cases, the image generation model is configured to generate a harmonized image based on an input text prompt. For example, the generated harmonized image may include aspects based on the provided positive or negative prompt. In some cases, the image generation model creates the harmonized image that aligns with the semantics of the prompt and implements a channel shift process to perform the harmonization.

A method, apparatus, and non-transitory computer readable medium for image processing are described. One or more aspects of the method, apparatus, and non-transitory computer readable medium include obtaining an input image and an input prompt, wherein the input image depicts a scene and the input prompt indicates a target element to be added to the scene; generating, using an image generation model, a normalized output based on the input image and the input prompt by performing a channel shift on a preliminary output of the image generation model; and generating, using the image generation model, a synthetic image based on the normalized output, wherein the synthetic image includes the scene of the input image and the target element of the input prompt, and wherein the target element is harmonized with the scene.

A method, apparatus, and non-transitory computer readable medium for image processing are described. One or more aspects of the method, apparatus, and non-transitory computer readable medium include obtaining an input image and an input prompt; generating a preliminary output based on the input prompt; computing a mean value based on the input image; generating a normalized output by performing a channel shift on the preliminary output based on the mean value; and generating a synthetic image based on the normalized output.

An apparatus and system for image processing are described. One or more aspects of the apparatus and system include at least one processor; at least one memory component coupled with the at least one processor; and an image generation model configured to generate a normalized output based on an input image and an input prompt by performing a channel shift on a preliminary output and to generate a synthetic image based on the normalized output.

DETAILED DESCRIPTION

Figure 1:
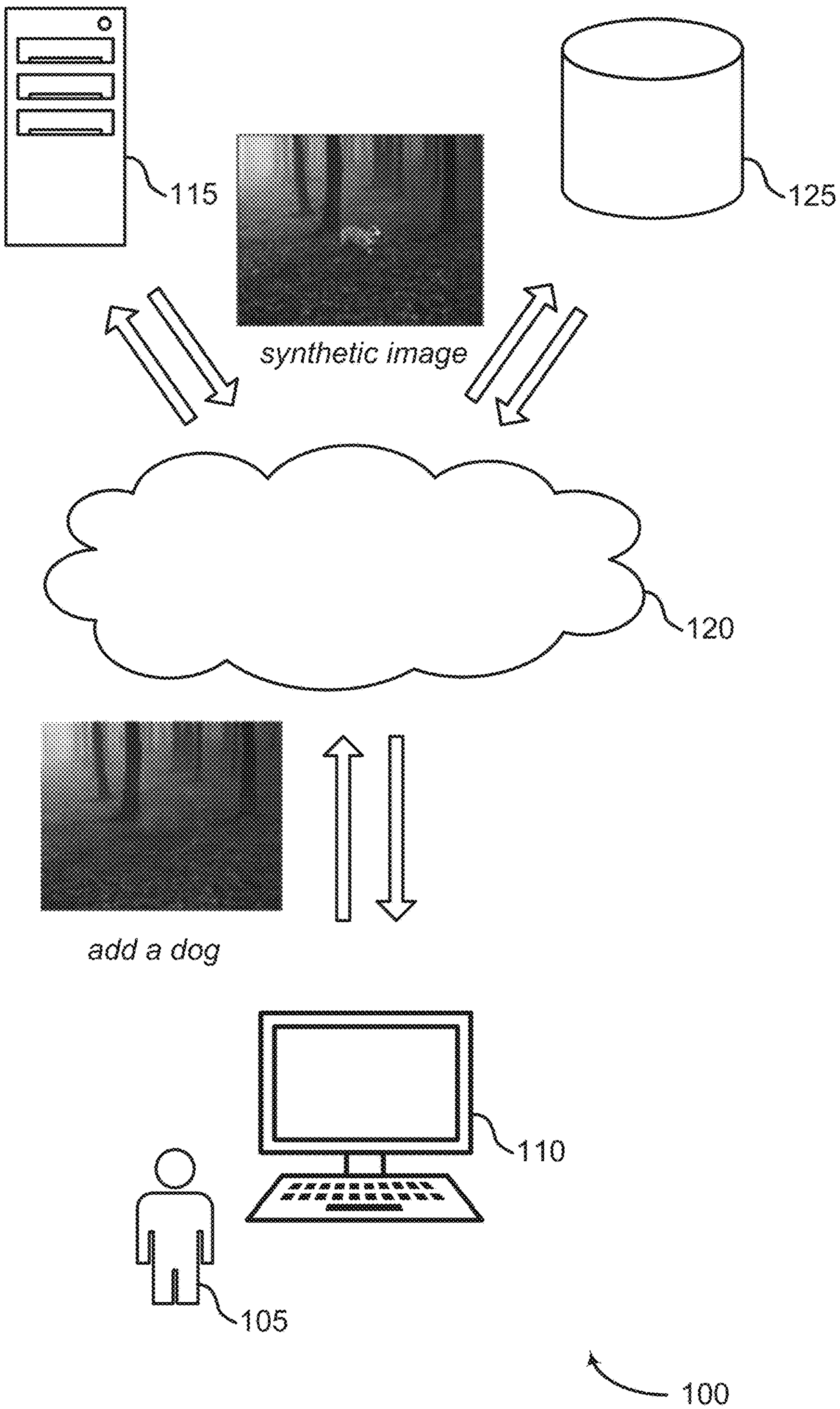
FIG. 1 shows an example of an image processing system according to aspects of the present disclosure.

The present disclosure describes systems and methods for image processing using machine learning. According to an embodiment, an image generation model generates an image based on a reference image and an input prompt (e.g., "add a dog"). The resulting image includes an element described by the input prompt harmonized with elements from the reference image. For example, the image generation model generates a synthetic image that adds a dog consistent with a scene of the reference image.

Machine learning models can be used for a variety of image generation and editing applications. However, existing methods cannot accurately incorporate new elements that are consistent with an existing scene. That is, conventional image generation models are not able to produce images based on a text prompt while harmonizing the elements of the image with the semantics of the image. Such models tend to generate images that include an element that stands out from the remaining regions (e.g., background, surroundings, etc.) of the image.

Some image generation models use algorithms such as classifier-free guidance (CFG) to generate new image elements based on random noise. For example, the models may predict noise to obtain a clear image. However, the predicted noise may fall outside of the distribution seen during training, resulting in poor normalization. This can result in generated images that include elements that are inconsistent with other elements in the image.

Embodiments of the present disclosure improve on conventional image generation models by more accurately generating images that incorporate new elements into an existing scene. For example, a generated image includes a dog that is consistent with a forest scene from a reference image provided by a user. The dog is harmonized or appears consistent with the forest scene. To achieve the harmonization, the image generation model performs a channel shift process (e.g., a mean shift of the image values) that is spatially guided by mask regions in the input image. In some cases, the channel shift process includes performing a normalization of the noise generated at each step of a diffusion process.

Embodiments of the present disclosure provide an image processing system that includes an image generation model for performing a harmonization of an image for an inpainting or an outpainting task. In some cases, the image generation model is configured to generate a harmonized image based on an input text prompt. For example, the generated harmonized image includes aspects based on the provided positive or negative input prompt. In some cases, the image generation model creates the harmonized image that aligns with the semantics of the prompt and implements a channel shift process to perform the harmonization.

The present disclosure describes systems and methods for a normalization process in a classifier-free guidance in case of an inpainting or an outpainting task. In some cases, the classifier-free guidance refers to a method in diffusion models that enables image generation based on a conditioning of an input (e.g., an input text prompt, etc.). According to an embodiment, a channel shift process is performed resulting in an image that includes an enhanced harmonization of image elements with the background. In some cases, the channel shift process is spatially guided via mask regions extracted from the image received as input.

An embodiment of the present disclosure is configured to perform a channel shift process. For example, values of channels of an image or a latent code can be mean-shifted, or shifted to be harmonized with colors or values present in image. In some cases, the channel shift is based on a local region of a target object (e.g., as indicated by an input mask).

In some cases, a normalization process is performed to ensure that the noise predicted based on the classifier-free guidance is within an expected distribution. In some cases, the image generation model of the present disclosure is configured to modify the diffusion model architecture based on computing a mean and a standard deviation based on values present within the mask regions (i.e., rather than the complete image). In some cases, the computation is performed for each of the inpainting and outpainting tasks.

According to an embodiment of the present disclosure, the normalization process is performed based on the channel shift computation. In some cases, the image generation model of the present disclosure computes a mean and performs a channel shift based on a rescaled classifier-free guidance before performing the normalization based on the computing a standard deviation value within the mask region. According to an embodiment, the mean and standard deviation is computed within the mask region at each time step of the inference of the modified diffusion model for the inpainting and outpainting tasks.

According to an embodiment of the present disclosure, the modified diffusion model architecture is configured to operate in a latent space. In some examples, the latent space includes a plurality of channels, such as the latent space includes twelve channels. In some examples, the first three channels of the latent space are RGB channels. An embodiment of the present disclosure applies the classifier-free guidance normalization to the modified diffusion model architecture for the first three RGB channels.

Embodiments of the present disclosure can be used in the context of image generation applications. For example, an image generation network based on the present disclosure takes a prompt (e.g., a positive prompt describing an element) and an image as input and efficiently generates a harmonized image. Example applications regarding generating an image that depicts the element harmonized with the image are provided with reference to FIGS. 1-3. Details regarding the architecture of the image generation system are provided with reference to FIGS. 4-9 and 13-14. Examples of a process for generating the harmonized image are provided with reference to FIG. 10. Examples of a process for training an image generation model are provided with reference to FIGS. 11-12.

Image Generation System

A system and an apparatus for image processing are described with reference to FIGS. 1-6. FIG. 1 shows an example of an image processing system 100 according to aspects of the present disclosure. In one aspect, image processing system 100 includes user 105, user device 110, image processing apparatus 115, cloud 120, and database 125.

In the example of FIG. 1, user 105 provides an image and a text prompt to image processing apparatus 115 via a user interface provided on user device 110 by image processing apparatus 115. In some cases, the input prompt is a text input. As used herein, “text prompt” refers to a positive or a negative prompt provided by a user to generate a harmonized image. As an example shown in FIG. 1, the user provides a text prompt that describes aspects of the image the user wants to modify using the image processing apparatus 115 of the present disclosure. According to some aspects, image processing apparatus 115 obtains an input prompt, i.e., a positive prompt (e.g., “add a dog”).

In some cases, the image processing apparatus 115 uses an image generation model (such as the image generation model described with reference to FIGS. 4-6) to generate a synthetic image (e.g., harmonized image) based on the text prompt. In some cases, as shown in FIG. 1, the user provides an image (e.g., depicting a dark forest background) and an instruction to add a dog (e.g., a positive prompt such as “add a dog”) into the scene depicted by the image. In some cases, the image processing apparatus 115 generates a harmonized image that incorporates the particular element (e.g., a dog) depicted in the image into the synthetic image. In some cases, the image generation model generates a synthetic image that depicts the dog, which is consistent with the rest of the image, e.g., the synthetic image depicts the dark forest background with the harmonized dog.

According to an embodiment, the harmonized element in an image refers to an element that is consistent in certain aspects with the remaining aspects of the image. For example, the element is considered harmonized when the element is consistent in lighting, consistent in pose, consistent in orientation, consistent in size, consistent in relationship with the remaining image. However, embodiments are not limited thereto, and harmonization of an element in an image may include any other aspect that ensures that an element is consistent with the image. In some examples, an element is considered harmonized in an image when the element blends seamlessly with the surrounding elements in terms of visual characteristics such as color, lighting, texture, etc. The process of harmonization ensures that the added or altered element appears as a natural part of the image rather than standing out as an incongruent element.

Referring to the example of FIG. 1, the image processing apparatus 115 provides the synthetic image to user 105 via the user interface provided on user device 110. According to some aspects, user device 110 is a personal computer, laptop computer, mainframe computer, palmtop computer, personal assistant, mobile device, or any other suitable processing apparatus. In some examples, user device 110 includes software that displays a user interface (e.g., a graphical user interface) provided by image processing apparatus 115. In some aspects, the user interface provides for information (such as images (custom images or synthetic image), a prompt, etc.) to be communicated between user 105 and image processing apparatus 115. Image processing apparatus 115 is an example of, or includes aspects of, the corresponding element described with reference to FIG. 4.

According to some aspects, a user device user interface enables user 105 to interact with user device 110. In some embodiments, the user device user interface may include an audio device, such as an external speaker system, an external display device such as a display screen, or an input device (e.g., a remote-control device interfaced with the user interface directly or through an I/O controller module). In some cases, the user device user interface may be a graphical user interface.

According to some aspects, image processing apparatus 115 includes a computer-implemented network. In some embodiments, the computer-implemented network includes a machine learning model (such as the image generation model described with reference to FIGS. 5 and 6). In some embodiments, image processing apparatus 115 also includes one or more processors, a memory subsystem, a communication interface, an I/O interface, one or more user interface components, and a bus as described with reference to FIG. 12. Additionally, in some embodiments, image processing apparatus 115 communicates with user device 110 and database 125 via cloud 120.

In some cases, image processing apparatus 115 is implemented on a server. A server provides one or more functions to users linked by way of one or more of various networks, such as cloud 120. In some cases, the server includes a single microprocessor board, which includes a microprocessor responsible for controlling all aspects of the server. In some cases, the server uses microprocessor and protocols to exchange data with other devices or users on one or more of the networks via hypertext transfer protocol (HTTP), and simple mail transfer protocol (SMTP), although other protocols such as file transfer protocol (FTP), and simple network management protocol (SNMP) may also be used. In some cases, the server is configured to send and receive hypertext markup language (HTML) formatted files (e.g., for displaying web pages). In various embodiments, the server comprises a general-purpose computing device, a personal computer, a laptop computer, a mainframe computer, a supercomputer, or any other suitable processing apparatus.

According to some aspects, image processing apparatus 115 obtains an input prompt and an image, where the text prompt describes a condition, e.g., a positive text prompt or a negative text prompt, e.g., the positive text prompt that describes an element to be harmonized. In some cases, the harmonized image depicts an image of the element that is consistent with the remaining aspects of the image. In some examples, image processing apparatus 115 obtains an image and a text prompt indicating an element to be modified, extracts an inpainting (and/or an outpainting) mask indicating a region for the element in the image, and generates a harmonized image based on the masked region and the text prompt.

Cloud 120 is a computer network configured to provide on-demand availability of computer system resources, such as data storage and computing power. In some examples, cloud 120 provides resources without active management by a user. The term "cloud" is sometimes used to describe data centers available to many users over the Internet. Some large cloud networks have functions distributed over multiple locations from central servers. A server is designated an edge server if it has a direct or close connection to a user. In some cases, cloud 120 is limited to a single organization. In other examples, cloud 120 is available to many organizations. In one example, cloud 120 includes a multi-layer communications network comprising multiple edge routers and core routers. In another example, cloud 120 is based on a local collection of switches in a single physical location. According to some aspects, cloud 120 provides communications between user device 110, image processing apparatus 115, and database 125.

Database 125 is an organized collection of data. In an example, database 125 stores data in a specified format known as a schema. According to some aspects, database 125 is structured as a single database, a distributed database, multiple distributed databases, or an emergency backup database. In some cases, a database controller manages data storage and processing in database 125. In some cases, a user interacts with the database controller. In other cases, the database controller operates automatically without interaction from the user. According to some aspects, database 125 is external to image processing apparatus 115 and communicates with image processing apparatus 115 via cloud 120. According to some aspects, database 125 is included in image processing apparatus 115.

Figure 2:
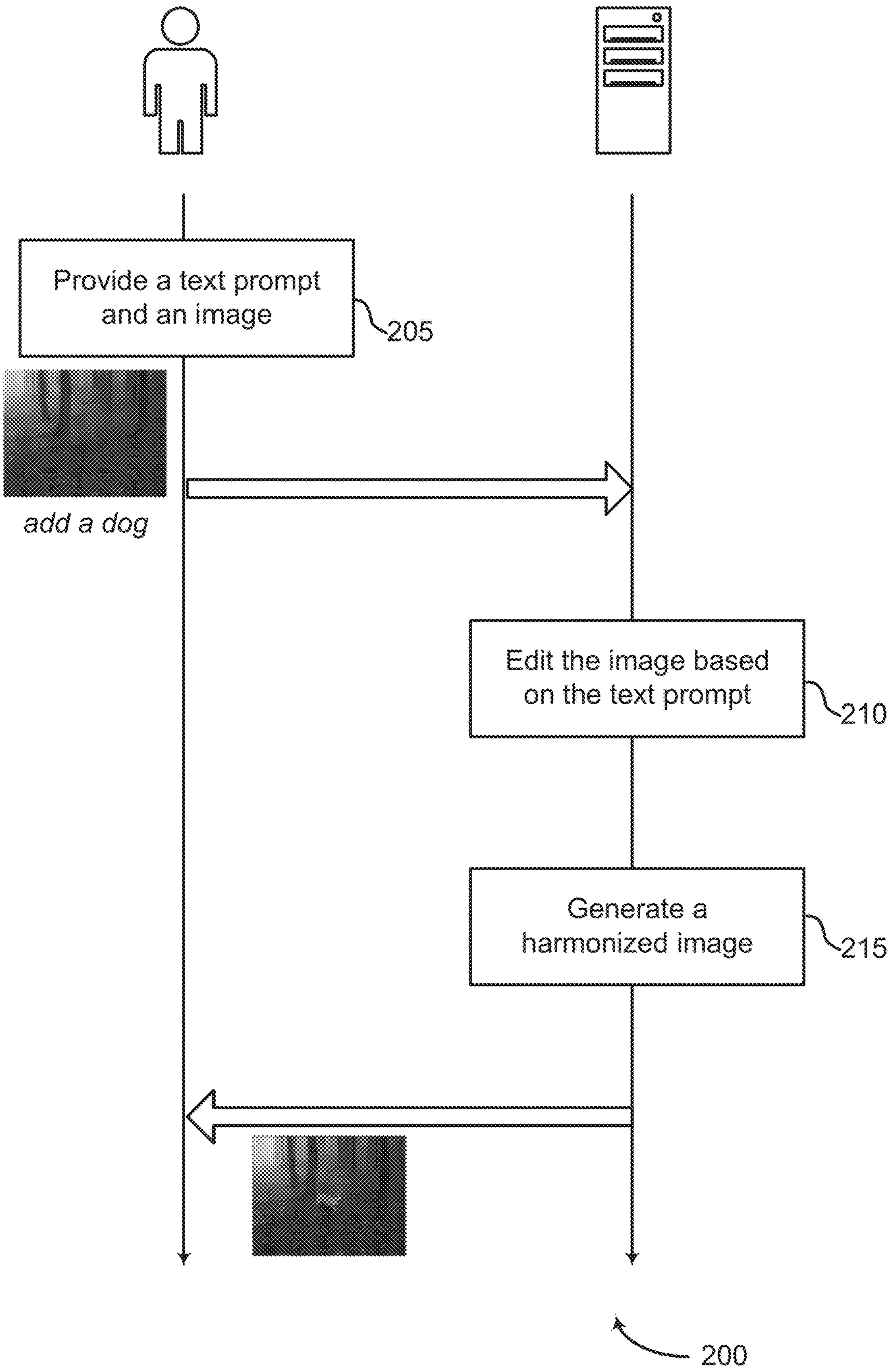
FIG. 2 shows an example of a method for generating a customized image according to aspects of the present disclosure.

FIG. 2 shows an example of a method 200 for generating a harmonized image according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

According to an embodiment of the present disclosure, an image processing apparatus (such as the image processing apparatus described with reference to FIGS. 1 and 4) provides an image generation model (such as the image generation model described with reference to FIGS. 4-6) that generates an image representing a harmonized element based on an input text prompt.

At operation 205, the system provides a text prompt and an image. In some cases, the operations of this step refer to, or may be performed by, a user as described with reference to FIG. 1. In some examples, the user provides a text prompt to the image processing apparatus (such as the image processing apparatus described with reference to FIG. 1). As shown in FIG. 2, the text prompt includes an element that the user wants to harmonize. For example, the user wants the synthetic (i.e., output) image to include a harmonized image of the "dog" specified in the text prompt. In some cases, the user provides the text prompt to the image processing apparatus via a user interface (such as a graphical user interface) provided on a user device by the image processing apparatus.

At operation 210, the system edits the image based on the text prompt. In some cases, the operations of this step refer to, or may be performed by, an image processing apparatus as described with reference to FIGS. 1 and 4. In some cases, the image processing apparatus edits the image based on the text prompt. For example, the text prompt is a positive text prompt. In some examples, the positive text prompt specifies a dog that the user wants to harmonize with the input image (as specified in the text prompt obtained in operation 205).

In some cases, the image processing apparatus (such as the image processing apparatus described with reference to FIGS. 1 and 4) edits the user provided image to ensure that the element specified in the text prompt is harmonized or consistent with the aspects of the input image. For example, as shown in FIG. 2, the editing process is performed to ensure that the dog is consistent with the input image that depicts a scene of a dark forest. In some examples, the dog in the scene of the dark forest is consistent with the dark forest scene of the input image. Further details regarding the harmonization process are provided with reference to FIGS. 1 and 5-7.

At operation 215, the system generates a harmonized image. In some cases, the operations of this step refer to, or may be performed by, an image processing apparatus as described with reference to FIGS. 1 and 4. In some cases, the harmonized image is generated based on the editing performed at operation 210. For example, the harmonized image depicts the dog that is consistent with the scene of the input image (as specified in the text prompt in operation 205). For example, in some cases, the image processing apparatus displays the harmonized image to the user via the user interface (such as the user interface described with reference to FIG. 1).

Figure 3:
FIG. 3 shows an example of an image harmonization process according to aspects of the present disclosure.

FIG. 3 shows an example of an image harmonization process 300 according to aspects of the present disclosure. In one aspect, image harmonization process 300 depicts image 305 and harmonized image 310. Image 305 is an example of, or includes aspects of, the corresponding element described with reference to FIGS. 1-2 and 7. Harmonized image 310 is an example of, or includes aspects of, the corresponding element described with reference to FIGS. 1-2 and 7.

Referring to FIG. 3, image 305 depicts an element of the image that is inconsistent with the scene of the image. For example, image 305 depicts a scene of a dark forest. As shown in image 305, the dog is inconsistent with the dark forest. For example, the dog is extremely bright and is not harmonized with the dark forest scene (i.e., not harmonized or consistent with remaining aspects of the image 305).

By contrast, a harmonized image (such as harmonized image 310 shown in FIG. 3) depicts an element of the image that is consistent with the scene of the image. For example, harmonized image 310 depicts a scene of a dark forest. As shown in harmonized image 310, the dog is consistent with the dark forest scene.

In some cases, an image generation apparatus (such as the image generation apparatus described with reference to FIGS. 1 and 5-7) generates image 305 based on a text prompt using a diffusion model (such as the diffusion model described with reference to FIG. 5). Additionally, the image generation apparatus generates harmonized image 310 based on a text prompt using a diffusion model (such as the diffusion model described with reference to FIGS. 5-6) that performs a channel shift process before implementing a standard deviation-based normalization process. Further details regarding the harmonization using the channel shift process are described with reference to FIGS. 5-7.

Figure 4:
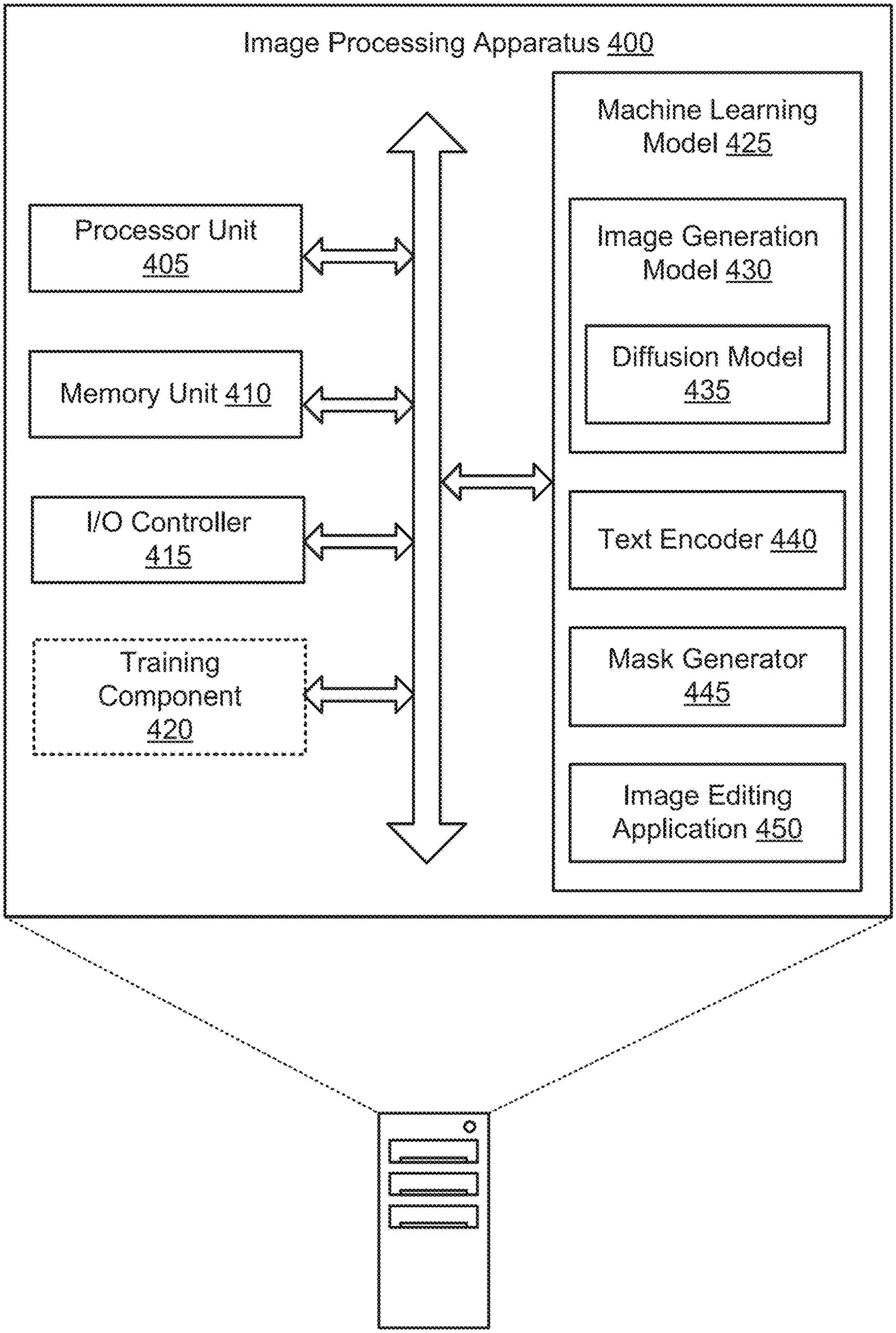
FIG. 4 shows an example of an image processing apparatus according to aspects of the present disclosure.

FIG. 4 shows an example of an image processing apparatus 400 according to aspects of the present disclosure. Image processing apparatus 400 is an example of, or includes aspects of, the corresponding element described with reference to FIG. 1. In one aspect, image processing apparatus 400 includes processor unit 405, memory unit 410, I/O controller 415, training component 420, and machine learning model 425.

Processor unit 405 includes one or more processors. A processor is an intelligent hardware device, such as a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof.

In some cases, processor unit 405 is configured to operate a memory array using a memory controller. In other cases, a memory controller is integrated into processor unit 405. In some cases, processor unit 405 is configured to execute computer-readable instructions stored in memory unit 410 to perform various functions. In some aspects, processor unit 405 includes special purpose components for modem processing, baseband processing, digital signal processing, or transmission processing. According to some aspects, processor unit 405 comprises the one or more processors described with reference to FIG. 11.

Memory unit 410 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause at least one processor of processor unit 405 to perform various functions described herein.

In some cases, memory unit 410 includes a basic input/output system (BIOS) that controls basic hardware or software operations, such as an interaction with peripheral components or devices. In some cases, memory unit 410 includes a memory controller that operates memory cells of memory unit 410. For example, the memory controller may include a row decoder, column decoder, or both. In some cases, memory cells within memory unit 410 store information in the form of a logical state. According to some aspects, memory unit 410 comprises the memory subsystem described with reference to FIG. 11.

I/O controller 415 may manage input and output signals for a device. I/O controller 415 may also manage peripherals not integrated into a device. In some cases, an I/O controller 415 may represent a physical connection or port to an external peripheral. In some cases, an I/O controller 415 may utilize an operating system such as iOS®, ANDROID®, MS-DOS®, MS-WINDOWS®, OS/2®, UNIX®, LINUX®, or another known operating system. In other cases, an I/O controller 415 may represent or interact with a modem, a keyboard, a mouse, a touchscreen, or a similar device. In some cases, an I/O controller 415 may be implemented as part of a processor. In some cases, a user may interact with a device via I/O controller 415 or via hardware components controlled by an I/O controller 415.

In some examples, I/O controller 415 includes a user interface. A user interface may enable a user to interact with a device. In some embodiments, the user interface may include an audio device, such as an external speaker system, an external display device such as a display screen, or an input device (e.g., a remote-control device interfaced with the user interface directly or through an I/O controller module). In some cases, a user interface may be a graphical user interface (GUI). In some examples, a communication interface operates at the boundary between communicating entities and the channel and may also record and process communications. Communication interface is provided herein to enable a processing system coupled to a transceiver (e.g., a transmitter and/or a receiver). In some examples, the transceiver is configured to transmit (or send) and receive signals for a communications device via an antenna.

According to some aspects, training component 420 is implemented as software stored in memory unit 410 and executable by processor unit 405, as firmware, as one or more hardware circuits, or as a combination thereof. According to some aspects, training component 420 is omitted from image processing apparatus 400. According to some aspects, training component 420 is implemented as software stored in memory and executable by a processor of an external apparatus, as firmware of the external apparatus, as one or more hardware circuits of the external apparatus, or as a combination thereof, and communicates with image processing apparatus 400 to perform the functions described herein.

According to some aspects, training component 420 trains, using the training set, the image generation model 430 to generate images including a harmonized element included in the text prompt by training each of a set of layers of the image generation model 430 to generate features representing a different harmonized element of the set of elements. In some examples, training component 420 updates parameters of the image generation model 430 based on the diffusion loss.

Machine learning model 425 is an example of, or includes aspects of, the corresponding element described with reference to FIG. 5. According to some aspects, machine learning model 425 is implemented as software stored in memory unit 410 and executable by processor unit 405, as firmware, as one or more hardware circuits, or as a combination thereof. According to some aspects, machine learning model 425 comprises image generation model 430 stored in memory unit 410.

Machine learning parameters, also known as model parameters or weights, are variables that provide a behavior and characteristics of a machine learning model. Machine learning parameters can be learned or estimated from training data and are used to make predictions or perform tasks based on learned patterns and relationships in the data. Machine learning parameters are typically adjusted during a training process to minimize a loss function or maximize a performance metric. The goal of the training process is to find optimal values for the parameters that allow the machine learning model to make accurate predictions or perform well on the given task.

For example, during the training process, an algorithm adjusts machine learning parameters to minimize an error or loss between predicted outputs and actual targets according to optimization techniques like gradient descent, stochastic gradient descent, or other optimization algorithms. Once the machine learning parameters are learned from the training data, the machine learning parameters are used to make predictions on new, unseen data.

Artificial neural networks (ANNs) have numerous parameters, including weights and biases associated with each neuron in the network, that control a degree of connections between neurons and influence the neural network's ability to capture complex patterns in data. An ANN is a hardware component or a software component that includes a number of connected nodes (i.e., artificial neurons) that loosely correspond to the neurons in a human brain. Each connection, or edge, transmits a signal from one node to another (like the physical synapses in a brain). When a node receives a signal, it processes the signal and then transmits the processed signal to other connected nodes.

In some cases, the signals between nodes comprise real numbers, and the output of each node is computed by a function of the sum of its inputs. In some examples, nodes may determine their output using other mathematical algorithms, such as selecting the max from the inputs as the output, or any other suitable algorithm for activating the node. Each node and edge are associated with one or more node weights that determine how the signal is processed and transmitted.

In ANNs, a hidden (or intermediate) layer includes hidden nodes and is located between an input layer and an output layer. Hidden layers perform nonlinear transformations of inputs entered into the network. Each hidden layer is trained to produce a defined output that contributes to a joint output of the output layer of the ANN. Hidden representations are machine-readable data representations of an input that are learned from hidden layers of the ANN and are produced by the output layer. As the understanding of the ANN of the input improves as the ANN is trained, the hidden representation is progressively differentiated from earlier iterations.

During a training process of an ANN, the node weights are adjusted to improve the accuracy of the result (i.e., by minimizing a loss which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times. In one aspect, machine learning model 425 includes image generation model 430, text encoder 440, mask generator 445, and image editing application 450.

According to some aspects, image generation model 430 generates, using an image generation model 430, a normalized output based on the input image and the input prompt by performing a channel shift on a preliminary output of the image generation model 430. In some examples, image generation model 430 generates, using the image generation model 430, a synthetic image based on the normalized output, where the synthetic image includes the scene of the input image and the target element of the input prompt, and where the target element is harmonized with the scene. In some examples, image generation model 430 generates the preliminary output based on the input prompt.

In some examples, image generation model 430 computes a mean value based on the input image. In some examples, image generation model 430 subtracts the mean value from the preliminary output. In some examples, image generation model 430 obtains a noise map. In some examples, image generation model 430 denoises the noise map to obtain the preliminary output. In some examples, image generation model 430 rescales the normalized output to obtain rescaled output, where the synthetic image is generated based on the rescaled output. In some examples, image generation model 430 computes a standard deviation based on the preliminary output, where the normalized output is rescaled based on the standard deviation. In some aspects, the preliminary output includes a set of color channels and a set of non-color channels, and where the channel shift is performed exclusively on the set of color channels.

According to some aspects, image generation model 430 generates a preliminary output based on the input prompt. In some examples, image generation model 430 computes a mean value based on the input image. In some examples, image generation model 430 generates a normalized output by performing a channel shift on the preliminary output based on the mean value. In some examples, image generation model 430 generates a synthetic image based on the normalized output. In some examples, image generation model 430 obtains a noise map. In some examples, image generation model 430 iteratively removes noise from the noise map.

In some examples, image generation model 430 generates the preliminary output based on the input prompt. In some examples, image generation model 430 computes the mean value based on the input image. In some examples, image generation model 430 subtracts the mean value from the preliminary output. In some examples, image generation model 430 rescales the normalized output to obtain rescaled output, where the synthetic image is generated based on the rescaled output. In some examples, image generation model 430 computes a standard deviation based on the preliminary output, where the normalized output is rescaled based on the standard deviation.

According to some aspects, image generation model 430 generates a normalized output based on an input image and an input prompt by performing a channel shift on a preliminary output and to generate a synthetic image based on the normalized output. In some aspects, the image generation model 430 includes a diffusion model 435. Image generation model 430 is an example of, or includes aspects of, the corresponding element described with reference to FIG. 6. In one aspect, image generation model 430 includes diffusion model 435.

Diffusion model 435 is a class of generative neural networks that can be trained to generate new data with features similar to features found in training data. Diffusion models can be used in text-to-image generation, image completion, image super-resolution, etc. by iteratively denoising a latent variable based on a Markovian or a non-Markovian forward and reverse diffusion process, providing for faster convergence and improved sample quality.

Diffusion model 435 is an example of, or includes aspects of, the corresponding element described with reference to FIG. 5. According to some aspects, diffusion model 435 is implemented as software stored in memory unit 410 and executable by processor unit 405, as firmware, as one or more hardware circuits, or as a combination thereof. According to some aspects, diffusion model 435 is part of image generation model 430 stored in memory unit 410. According to some aspects, diffusion model 435 trains key parameters and value parameters of a cross-attention layer for each preliminary output. In some aspects, a layer of the diffusion model 435 includes a cross-attention layer.

In the machine learning field, an attention mechanism is a method of placing differing levels of importance on different elements of an input. Some sequence models process an input sequence sequentially, maintaining an internal hidden state that captures information from previous steps. However, in some cases, this sequential processing leads to difficulties in capturing long-range dependencies or attending to specific parts of the input sequence.

The attention mechanism addresses these difficulties by enabling an ANN to selectively focus on different parts of an input sequence, assigning varying degrees of importance or attention to each part. The attention mechanism achieves the selective focus by considering the relevance of each input element with respect to a current state of the ANN.

In some cases, an ANN employing an attention mechanism receives an input sequence and maintains its current state, which represents an understanding or context. For each element in the input sequence, the attention mechanism computes an attention score that indicates the importance or relevance of that element given the current state. The attention scores are transformed into attention weights through a normalization process (e.g., applying a softmax function). The attention weights represent the contribution of each input element to the overall attention. The attention weights are used to compute a weighted sum of the input elements, resulting in a context vector. The context vector represents the attended information or the part of the input sequence that the ANN considers most relevant for the current step. The context vector is combined with the current state of the ANN, providing additional information and influencing subsequent predictions or decisions of the ANN.

In some cases, by incorporating an attention mechanism, an ANN dynamically allocates attention to different parts of the input sequence, allowing the ANN to focus on relevant information and capture dependencies across longer distances.

In some cases, calculating attention involves three basic steps. First, a similarity between a query vector Q and a key vector K obtained from the input is computed to generate attention weights. In some cases, similarity functions used for this process include dot product, splice, detector, and the like. Next, a softmax function is used to normalize the attention weights. Finally, the attention weights are weighed together with their corresponding values V. In the context of an attention network, the key K and value V are typically vectors or matrices that are used to represent the input data. The key K is used to determine which parts of the input the attention mechanism should focus on, while the value V is used to represent the actual data being processed.

In some cases, an attention mechanism may refer to a self-attention mechanism and/or a cross-attention mechanism. A self-attention mechanism enables a network to weigh input elements selectively (e.g., based on a relevance to other elements), emphasizing important features during computation. The self-attention mechanism incorporates dynamic attention scores, optimizing information processing. Additionally, a cross-attention mechanism facilitates effective interaction between different input sequences in neural network architectures by dynamically assigning attention scores based on their relevance. The cross-attention mechanism enhances model performance by providing for the network to focus on key features from one sequence while processing another, enabling more nuanced and context-aware information processing.

According to some aspects, text encoder 440 is configured to encode the input prompt to obtain a text embedding, wherein the preliminary output is generated based on the text embedding. Text encoder 440 is an example of, or includes aspects of, the corresponding element described with reference to FIG. 6-7. According to some aspects, text encoder 440 is implemented as software stored in memory unit 410 and executable by processor unit 405, as firmware, as one or more hardware circuits, or as a combination thereof. According to some aspects, text encoder 440 is part of machine learning model 425 stored in memory unit 410.

According to some aspects, mask generator 445 obtains a mask indicating a location of the target element, where the mean value is computed based on the mask. According to some aspects, mask generator 445 is configured to generate a mask indicating a location of the target element, wherein a mean value is computed based on the mask. Mask generator 445 is an example of, or includes aspects of, the corresponding element described with reference to FIG. 5. According to some aspects, mask generator 445 is implemented as software stored in memory unit 410 and executable by processor unit 405, as firmware, as one or more hardware circuits, or as a combination thereof. According to some aspects, mask generator 445 is part of machine learning model 425 stored in memory unit 410.

According to some aspects, image editing application 450 obtains an input image and an input prompt, where the input image depicts a scene and the input prompt indicates a target element to be added to the scene. According to some aspects, image editing application 450 comprises a user interface configured to obtain the input image and the input prompt.

Image editing application 450 is an example of, or includes aspects of, the corresponding element described with reference to FIG. 5. According to some aspects, image editing application 450 is implemented as software stored in memory unit 410 and executable by processor unit 405, as firmware, as one or more hardware circuits, or as a combination thereof. According to some aspects, image editing application 450 is part of machine learning model 425 stored in memory unit 410.

Figure 5:
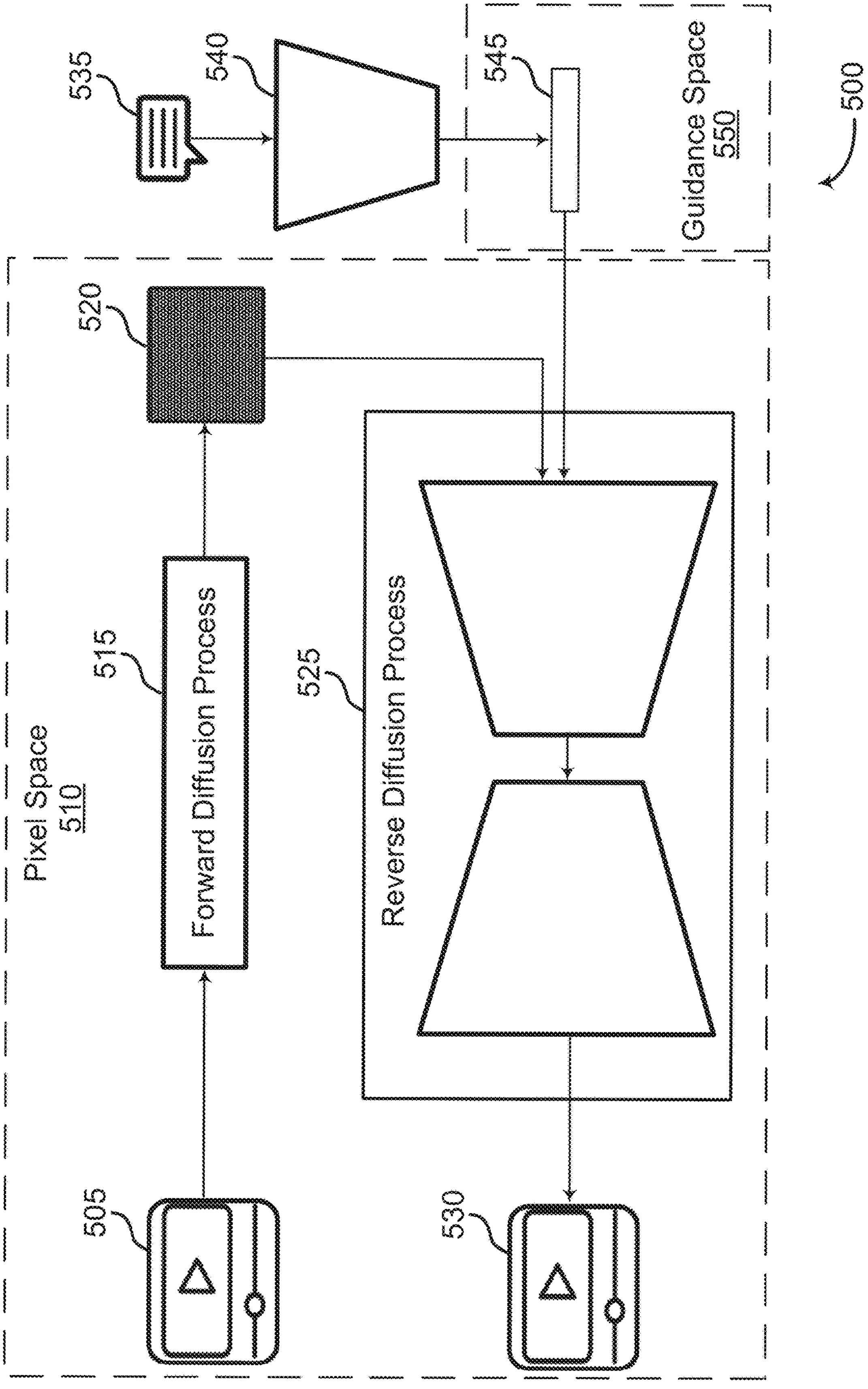
FIG. 5 shows an example of a guided diffusion model according to aspects of the present disclosure.

FIG. 5 shows an example of a guided diffusion model 500 according to aspects of the present disclosure. In some examples, guided diffusion model 500 describes the operation and architecture of the image generation model 1415 described with reference to FIG. 14. The guided latent diffusion model 500 depicted in FIG. 5 is an example of, or includes aspects of, a media generation model as described herein.

Diffusion models are a class of generative neural networks which can be trained to generate new data with features similar to features found in training data. In particular, diffusion models can be used to generate novel media items such as images, audio files, videos, three-dimensional (3D) models or other digital media items. Diffusion models can be used for various media processing tasks including image super-resolution, generation of media items with perceptual metrics, conditional generation (e.g., generation based on text guidance), image inpainting, and media manipulation.

Diffusion models work by iteratively adding noise to the data during a forward process and then learning to recover the data by denoising the data during a reverse process. For example, during training, guided latent diffusion model 500 may take an original media item 505 in a pixel space 510 as input and apply forward diffusion process 530 to gradually add noise to the original media item 505 to obtain noisy media item 520 at various noise levels.

Next, a reverse diffusion process 525 (e.g., a U-Net) gradually removes the noise from the noisy media item 520 at the various noise levels to obtain an output media item 530. In some cases, an output media item 530 is created from each of the various noise levels. The output media item 530 can be compared to the original media item 505 to train the reverse diffusion process 525.

The reverse diffusion process 525 can also be guided based on a text prompt 535, or another guidance prompt, such as an image, a layout, a segmentation map, etc. The text prompt 535 can be encoded using a text encoder 565 (e.g., a multimodal encoder) to obtain guidance features 545 in guidance space 550. The guidance features 545 can be combined with the noisy media item 520 at one or more layers of the reverse diffusion process 525 to ensure that the output media item 530 includes content described by the text prompt 535. For example, guidance features 545 can be combined with the noisy features using a cross-attention block within the reverse diffusion process 525.

Methods of operating diffusion models include a Denoising Diffusion Probabilistic Model (DDPM) and a Denoising Diffusion Implicit Models (DDIM). In DDPM, the generative process includes reversing a stochastic Markov diffusion process. DDIMs, on the other hand, use a deterministic process so that the same input results in the same output. In some cases, DDIM can reduce the number of timesteps during media generation. Diffusion models may also be characterized by whether the noise is added to the media item itself, or to media features generated by an encoder (i.e., latent diffusion). In a pixel diffusion model, noise is added and removed in pixel space. In a latent diffusion model, the noise is added (and removed) in a latent space of media features rather than in pixel space. Thus, a latent diffusion model generates media features using reverse diffusion, and these media features can be decoded to obtain a synthetic media item.

Figure 6:
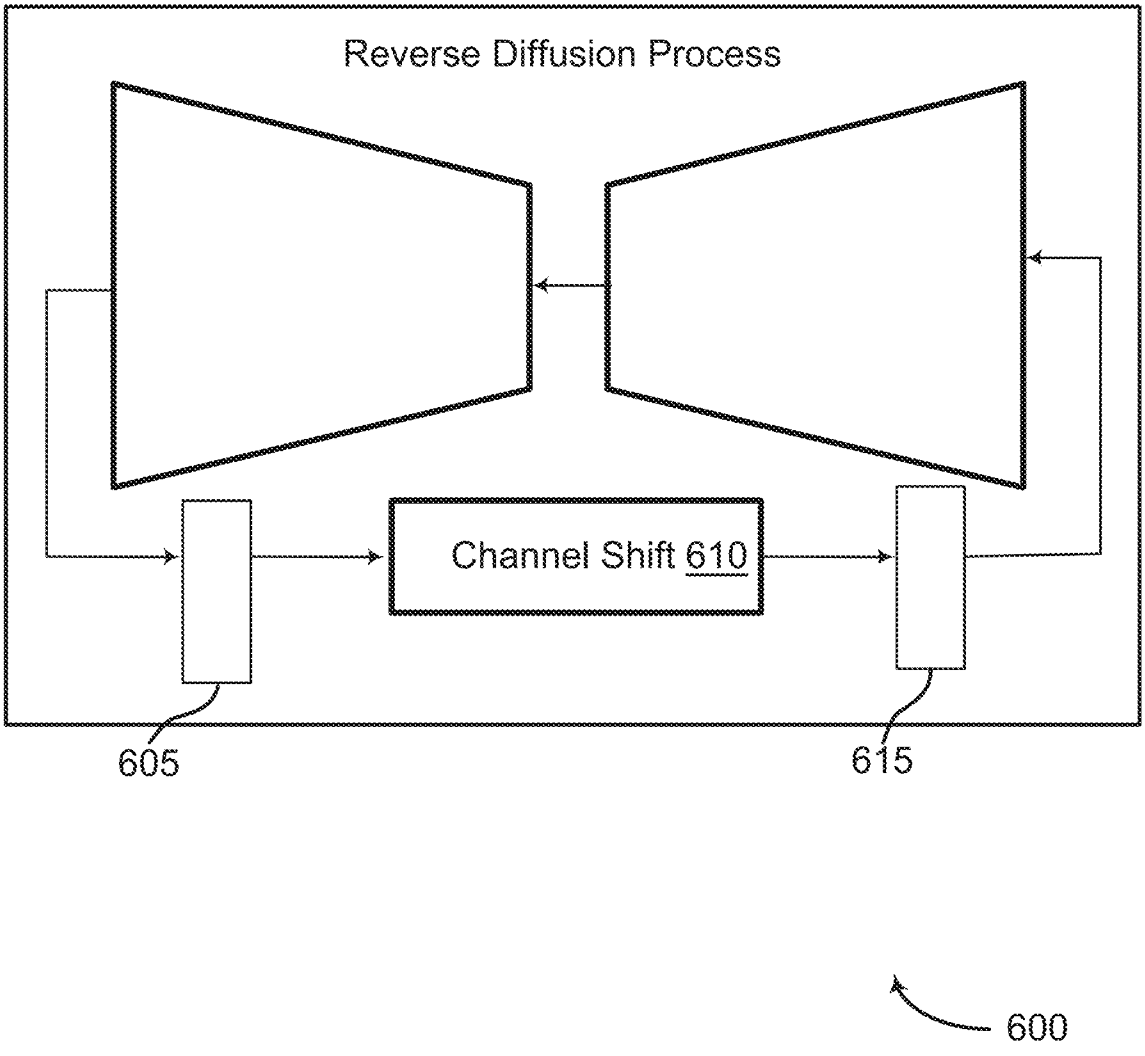
FIG. 6 shows an example of an image generation model according to aspects of the present disclosure.

FIG. 6 shows an example of a reverse diffusion process 600 according to aspects of the present disclosure. Reverse diffusion process 600 is an example of, or includes aspects of, the corresponding element described with reference to FIG. 5. In one aspect, reverse diffusion process 600 includes preliminary output 605 and rescaled output 615 based on performing channel shift 610.

As described with reference to FIG. 5, the forward diffusion process provides for sampling $x_t$ at an arbitrary timestep t in closed form. According to an embodiment, a signal-to-noise ratio (SNR) is computed. In some examples, at a terminal timestep T=1000 (such as a timestep representing the end of a diffusion process), the image generation model provides a terminal SNR. In some cases, as the terminal SNR value approaches zero, the classifier-free guidance is sensitive and causes images to be overexposed.

Classifier-free guidance is a method used in generative models to enhance output quality and control without the need for explicit external classifiers. Instead, the generative model, such as a diffusion model (e.g., diffusion model 500 described with reference to FIG. 5), is trained with conditional information embedded directly into its architecture. During the training phase, the model learns to generate data (e.g., images) based on input conditions (e.g., text descriptions) by establishing a relationship between the conditions and the generated content.

In some cases, the model receives the input condition and an indicator specifying whether it should utilize this condition during training. The dual-input approach enables the model to learn how to generate outputs with and without the guidance of the condition, effectively integrating the guidance mechanism within the diffusion structure. During the generation phase, the model leverages the learned behavior to produce high-quality, conditionally accurate outputs directly from the input prompts. The method significantly improves the coherence and fidelity of the generated content, reduces computational complexity, and enhances the overall efficiency of the generation process.

In some cases, classifier-free guidance (CFG) is a method used during an inference time of the diffusion model to provide control on the dependence of the generation process on conditioning such as text, etc. based on a weight of the CFG. According to an embodiment, the classifier-free guidance is rescaled making the classifier-free guidance applicable to image-space and latent-space models.

$$x_{cfg} = x_{neg} + w(x_{pos} - x_{neg}) \tag{1}$$

where w is the guidance weight, $x_{pos}$ and $x_{neg}$ are the model outputs (such as preliminary output 605) using positive and negative prompts, respectively. In some cases, when w is large, the scale of the resulting $x_{cfg}$ is large and the predicted noise is beyond the desired noise distribution, resulting in over-exposure.

An embodiment of the present disclosure is configured to perform a normalization process that ensures the predicted noise after CFG is within the expected distribution. In some cases, channel shift 610 is performed before performing standard deviation based normalization. In some cases, mean shift 610 includes computation of mean for the values with the mask region (such as mask region described with reference to FIGS. 1 and 4). The computation of mean is performed at each time step of inference.

According to an embodiment, the channel shift is computed based on a mean value of either global or local channel values. For example, a mean for the values within the mask is computed as $\mu_{M\odot cfg}$=mean($x_{cfg}$) and $\mu_{M\odot pos}$=mean($x_{pos}$). In some cases, channel shift 610 is performed to obtain a normalized output. In some cases, the normalized output is obtained based on computing a difference between the rescaled classifier-free guidance $x_{cfg}$ and the mean for the rescaled classifier-free guidance $\mu_{M\odot cfg}$, i.e., the normalized output is given as $x_{cfg}-{}_{M\odot cfg}$.

An embodiment of the present disclosure is configured to perform rescaling after the classifier-free guidance. In some cases, standard deviation is computed for $x_{pos}$ and $x_{cfg}$; where $x_{pos}$, $x_{cfg} \in \mathbb{R}$. The standard deviation is computed as $\sigma_{M\odot cfg}$=std($x_{cfg}$) and $\sigma_{M\odot pos}$=std($x_{pos}$). As described herein, each of the standard deviation and the mean are computed based on values within the mask region. The rescaling is applied as:

$$x_{rescale} = (x_{cfg} - \mu_{M\odot cfg}) \cdot \frac{\sigma_{M\odot pos}}{\sigma_{M\odot cfg}} + \mu_{M\odot pos} \tag{2}$$

Therefore, rescaling the normalized output generates a rescaled output. In some cases, the harmonized image is generated based on the rescaled output (based on Equation 4).

Figure 7:
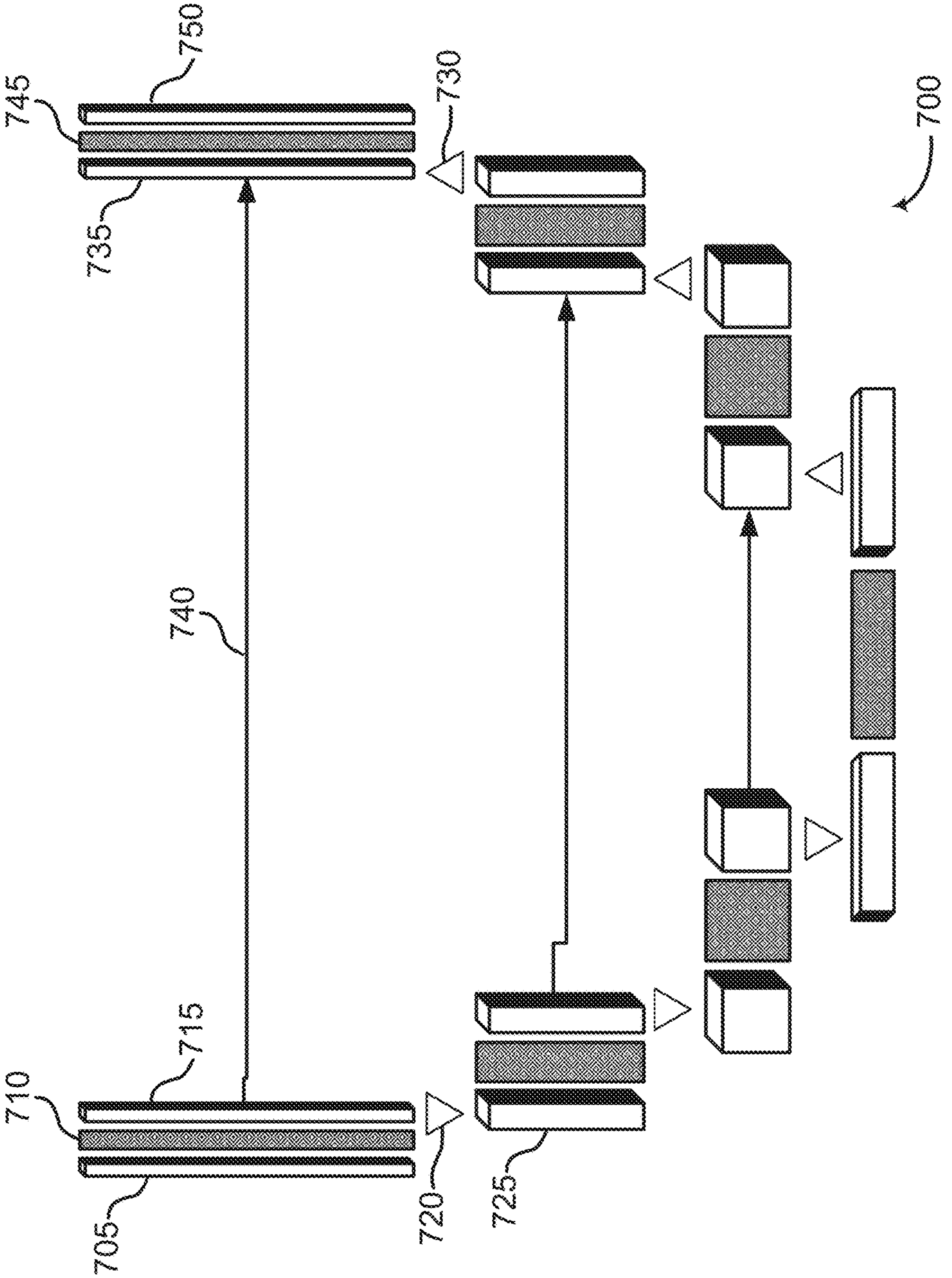
FIG. 7 shows an example of a U-Net according to aspects of the present disclosure.

FIG. 7 shows an example of a U-Net 700 according to aspects of the present disclosure. In some examples, U-Net 700 is an example of the component that performs the reverse diffusion process 525 of guided diffusion model 500 described with reference to FIG. 5 and includes architectural elements of the image generation model 1415 described with reference to FIG. 14. The U-Net 700 depicted in FIG. 7 is an example of, or includes aspects of, the architecture used within the reverse diffusion process described with reference to FIG. 5.

In some examples, diffusion models are based on a neural network architecture known as a U-Net. The U-Net 700 takes input features 705 having an initial resolution and an initial number of channels and processes the input features 705 using an initial neural network layer 710 (e.g., a convolutional network layer) to produce intermediate features 715. The intermediate features 715 are then down-sampled using a down-sampling layer 720 such that down-sampled features 725 features have a resolution less than the initial resolution and a number of channels greater than the initial number of channels.

This process is repeated multiple times, and then the process is reversed. That is, the down-sampled features 725 are up-sampled using up-sampling process 730 to obtain up-sampled features 735. The up-sampled features 735 can be combined with intermediate features 715 having the same resolution and number of channels via a skip connection 740. These inputs are processed using a final neural network layer 745 to produce output features 750. In some cases, the output features 750 have the same resolution as the initial resolution and the same number of channels as the initial number of channels.

In some cases, U-Net 700 takes additional input features to produce conditionally generated output. For example, the additional input features could include a vector representation of an input prompt. The additional input features can be combined with the intermediate features 715 within the neural network at one or more layers. For example, a cross-attention module can be used to combine the additional input features and the intermediate features 715.

Figure 8:
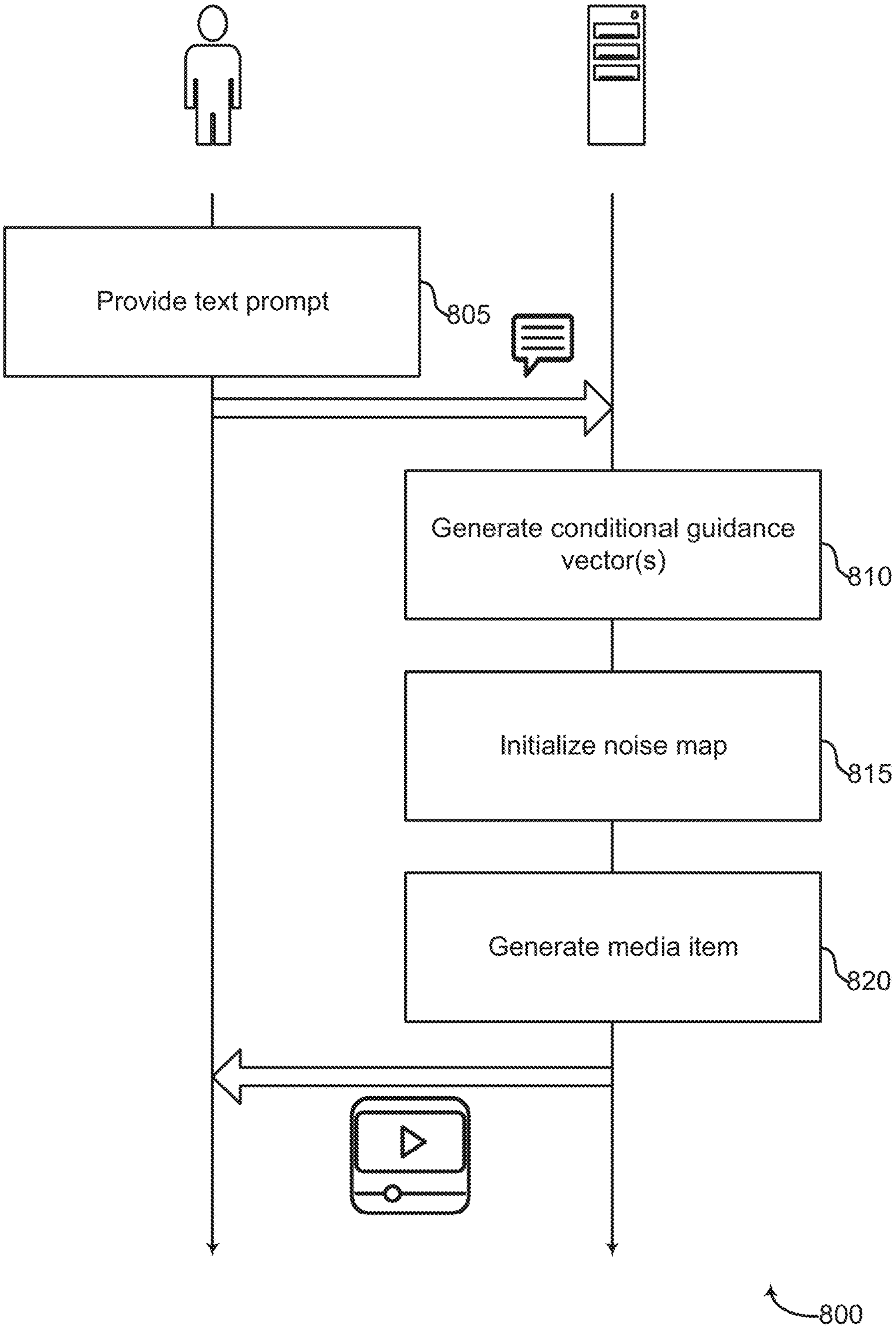
FIG. 8 shows an example of a method for conditional media generation according to aspects of the present disclosure.

FIG. 8 shows an example of a method 800 for conditional media generation according to aspects of the present disclosure. In some examples, method 800 describes an operation of the image generation model 1415 described with reference to FIG. 14 such as an application of the guided diffusion model 500 described with reference to FIG. 5. In some examples, these operations are performed by a system including a processor executing a set of codes to control functional elements of an apparatus such as the media generation model described in FIG. 5.

Additionally or alternatively, steps of the method 800 may be performed using special-purpose hardware. Generally, these operations are performed according to the methods and processes described in accordance with aspects of the present disclosure. In some cases, the operations described herein are composed of various substeps, or are performed in conjunction with other operations.

At operation 805, a user provides a text prompt describing content to be included in a generated media item. For example, a user may provide the prompt "a person playing with a cat". In some examples, guidance can be provided in a form other than text, such as via an image, a sketch, or a layout.

At operation 810, the system converts the text prompt (or other guidance) into a conditional guidance vector or other multi-dimensional representation. For example, text may be converted into a vector or a series of vectors using a transformer model, or a multi-modal encoder. In some cases, the encoder for the conditional guidance is trained independently of the diffusion model.

At operation 815, a noise map is initialized that includes random noise. The noise map may be in a pixel space or a latent space. By initializing a media item with random noise, different variations of a media item including the content described by the conditional guidance can be generated.

At operation 820, the system generates a media item based on the noise map and the conditional guidance vector. For example, the media item may be generated using a reverse diffusion process as described with reference to FIG. 9.

Figure 9:
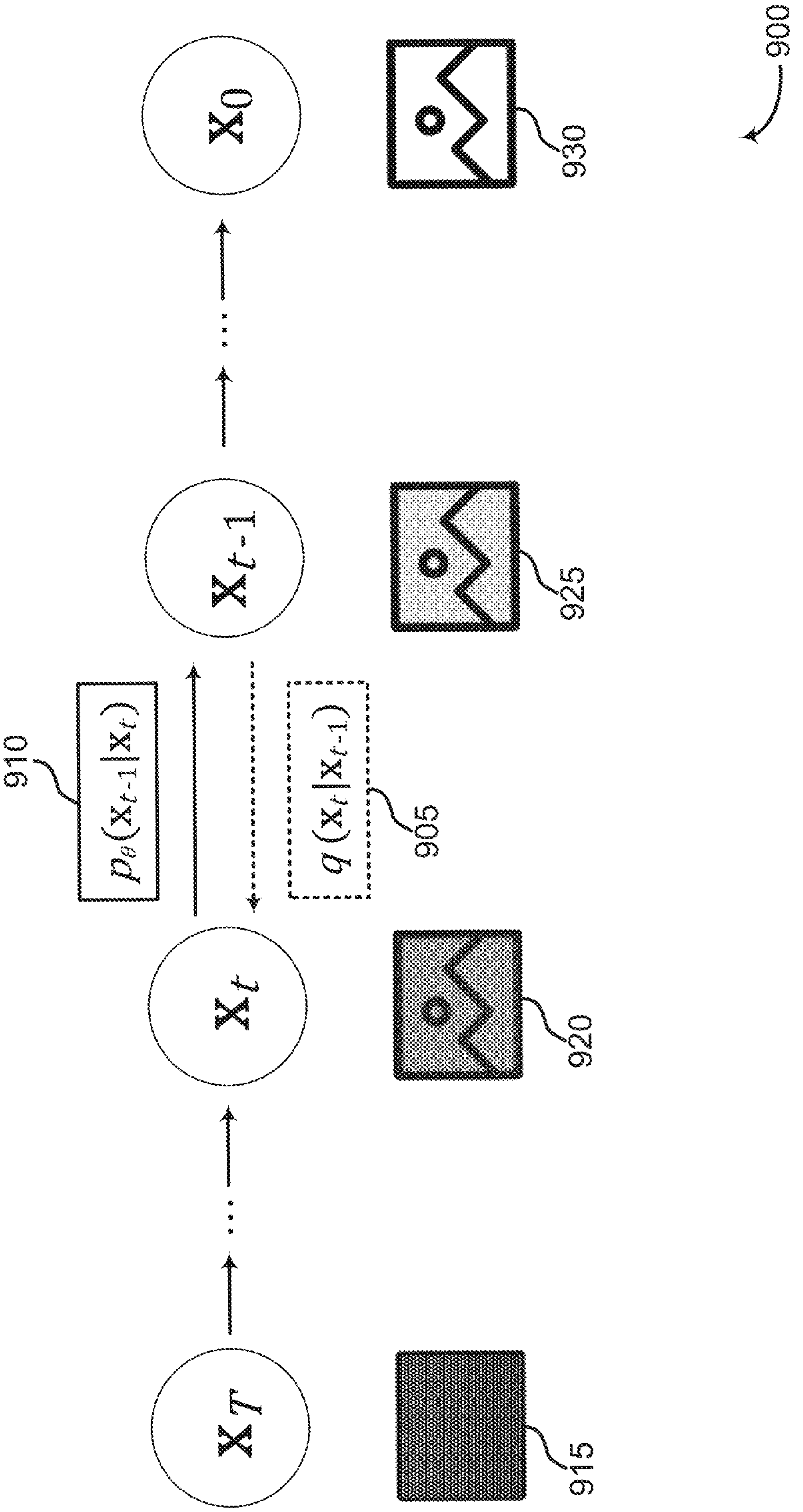
FIG. 9 shows a diffusion process according to aspects of the present disclosure.

FIG. 9 shows a diffusion process 900 according to aspects of the present disclosure. In some examples, diffusion process 900 describes an operation of the image generation model 1415 described with reference to FIG. 14, such as the reverse diffusion process 525 of guided diffusion model 500 described with reference to FIG. 5.

As described above with reference to FIG. 5, using a diffusion model can involve both a forward diffusion process 905 for adding noise to a media item (or features in a latent space) and a reverse diffusion process 910 for denoising the media item (or features) to obtain a denoised media item. The forward diffusion process 905 can be represented as $q(x_t|x_{t-1})$, and the reverse diffusion process 910 can be represented as $p(x_{t-1}|x_t)$. In some cases, the forward diffusion process 905 is used during training to generate media items with successively greater noise, and a neural network is trained to perform the reverse diffusion process 910 (i.e., to successively remove the noise).

In an example forward process for a latent diffusion model, the model maps an observed variable $x_0$ (either in a pixel space or a latent space) intermediate variables $x_1, \ldots, x_T$ using a Markov chain. The Markov chain gradually adds Gaussian noise to the data to obtain the approximate posterior $q(x_{1:T}|x_0)$ as the latent variables are passed through a neural network such as a U-Net, where $x_1, \ldots, x_T$ have the same dimensionality as $x_0$.

The neural network may be trained to perform the reverse process. During the reverse diffusion process 910, the model begins with noisy data $x_T$, such as a noisy media item 915 and denoises the data to obtain the $p(x_{t-1}|x_t)$. At each step t−1, the reverse diffusion process 910 takes $x_t$, such as first intermediate media item 920, and t as input. Here, t represents a step in the sequence of transitions associated with different noise levels, The reverse diffusion process 910 outputs $x_{t-1}$, such as second intermediate media item 925 iteratively until $x_T$ reverts back to $x_0$, the original media item 930. The reverse process can be represented as:

$$p_\theta(x_{t-1}|x_t) := N\left(x_{t-1};\, \mu_\theta(x_t, t),\, \textstyle\sum_\theta(x_t, t)\right). \quad (3)$$

The joint probability of a sequence of samples in the Markov chain can be written as a product of conditionals and the marginal probability:

$$x_T{:}\,p_\theta(x_{0:T}) := p(x_T)\prod_{t=1}^{T} p_\theta(x_{t-1}|x_t), \quad (4)$$

where $p(x_T)=N(x_T;\, 0, I)$ is the pure noise distribution as the reverse process takes the outcome of the forward process, a sample of pure noise, as input and $$\prod_{t=1}^{T} p_\theta(x_{t-1}|x_t)$$

represents a sequence of Gaussian transitions corresponding to a sequence of addition of Gaussian noise to the sample.

At interference time, observed data $x_0$ in a pixel space can be mapped into a latent space as input and a generated data $\tilde{x}$ is mapped back into the pixel space from the latent space as output. In some examples, $x_0$ represents an original input media item with low quality, latent variables $x_1, \ldots, x_T$ represent noisy media items, and x represents the generated item with high quality.

Thus, one or more aspects of the systems and apparatus include at least one processor; at least one memory component coupled with the at least one processor; and an image generation model comprising parameters stored in the at least one memory component and trained to generate a normalized output based on an input image and an input prompt by performing a mean shift on a preliminary output and to generate a synthetic image based on the normalized output.

Some examples of the apparatus and system further include a text encoder configured to encode the input prompt to obtain a text embedding, wherein the preliminary output is generated based on the text embedding.

Some examples of the apparatus and system further include a mask generator configured to generate a mask indicating a location of the target element, wherein a mean value is computed based on the mask.

In some aspects, the image generation model comprises a diffusion model.

Some examples of the apparatus and system further include an image editing application comprising a user interface configured to obtain the input image and the input prompt.

Image Generation Process

A method for image generation is described with reference to FIG. 10. Embodiments of the method are configured to generate an image that includes an element that is harmonized with the scene of the image. In some cases, an element described by an input prompt is added to the scene of the image based on a mask region. In some cases, the output image depicts the added element that is harmonized or consistent (e.g., consistent in terms of lighting, pose, orientation, size, and relationship) with the scene of the image. In some cases, the image generation model generates the image including added/new elements based on text prompt.

The image generation model performs classifier-free guidance (CFG) during inference of diffusion model. In some cases, a channel shift process is performed to ensure that the predicted noise after performing CFG in within an expected distribution. An embodiment of the present disclosure is configured to perform the channel shift before implementing a standard deviation based normalization to the CFG output. Accordingly, by performing a channel shift before performing the normalization, embodiments of the present disclosure are able to reduce artifacts and enhance the harmonization of the added element with the scene of the input image.

An embodiment of the present disclosure is configured to perform a channel shift before applying standard-deviation based normalization. In some cases, computation of mean and standard deviation is performed for the values within the mask region. In some cases, the computation of the mean and standard deviation is performed at each timestep of inference for the inpainting and/or outpainting task. Accordingly, by computing the statistics within the mask, embodiments are able to prevent an influence of unreliable statistics outside the mask and thus more accurately perform the normalization process.

An embodiment of the present disclosure is configured to perform the normalization process for a channel of the latent space. In some cases, the diffusion model operates in latent space. For example, the latent space includes twelve channels. In some examples, the first three channels among the twelve channels of the latent space are RGB channels. According to an embodiment, the CFG-based normalization is performed for the first three RGB channels.

Figure 10:
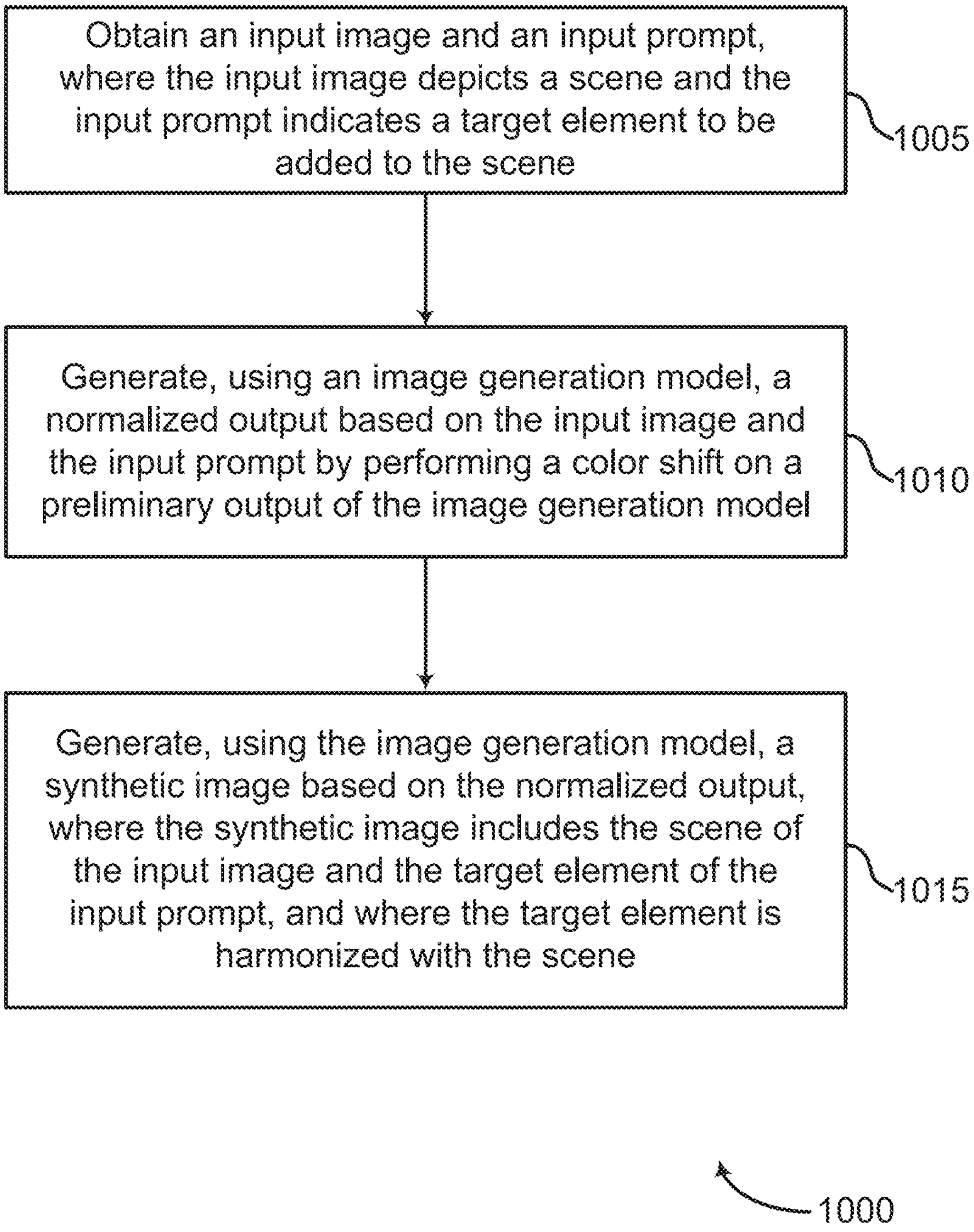
FIG. 10 shows an example of a method for image processing according to aspects of the present disclosure.

FIG. 10 shows an example of a method 1000 for image processing according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Embodiments of the present disclosure include a method for performing channel shift and masked normalization for CFG. According to an embodiment, the image processing apparatus (such as the image processing apparatus described with reference to FIG. 4) obtains an input prompt that includes an object or element. In some cases, the input prompt is a text prompt. In some examples, the input prompt states that "add a dog" (as described with reference to FIG. 1).

In some cases, the image processing apparatus comprises an image editing application (such as image editing application 450 described with reference to FIG. 4) that is configured to receive an input image and an input prompt. In some cases, the image processing apparatus comprises a text encoder configured to encode the input prompt. In some cases, the image processing apparatus comprises a mask generator. In some cases, the mask generator is configured to mask a region of the received image where the element is to be added. For example, the mask indicates a location of the dog in the received image.

In some cases, the image processing apparatus comprises an image generation model. In some cases, the image generation model includes a diffusion model (such as diffusion model 435 described with reference to FIG. 4 and diffusion model 500 described with reference to FIG. 5) that implements the normalization process (such as process 600 described with reference to FIG. 6). In some cases, a channel shift is performed before performing the normalization process, where the channel shift is computed based on computing the mean values within the mask region (as described with reference to FIG. 6) followed by standard deviation based normalization to obtain a rescaled output. In some cases, a synthetic (i.e., harmonized) image is generated based on the rescaled output.

At operation 1005, the system obtains an input image and an input prompt, where the input image depicts a scene and the input prompt indicates a target element to be added to the scene. In some cases, the operations of this step refer to, or may be performed by, an image editing application as described with reference to FIG. 4.

For example, in some cases, the image editing application (such as the image editing application 450 described with reference to FIG. 4) of the image processing apparatus receives an input prompt from a user (such as the user described with reference for FIG. 1). In some cases, the text prompt includes instructions regarding an element (e.g., regarding adding an element to an input image). In some cases, the image processing apparatus receives an input image from the user or database or any other data source.

At operation 1010, the system generates, using an image generation model, a normalized output based on the input image and the input prompt by performing a channel shift on a preliminary output of the image generation model. In some cases, the operations of this step refer to, or may be performed by, an image generation model as described with reference to FIGS. 4 and 6.

In some cases, mask generator is configured to mask a region of the input image that indicates a location of the element in the input prompt. In some cases, the image generation model generates a normalized output by performing a channel shift in the mask region. In some cases, a classifier-free guidance is rescaled to generate $x_{cfg}$. In some cases, the image generation model performs a channel shift that includes computing a mean for the values with the mask region at each time step of inference of the diffusion model. In some cases, the normalized output is obtained based on computing a difference between the rescaled classifier-free guidance and the mean for the rescaled classifier-free guidance.

Additionally, the image generation model is configured to apply a rescaling process after the classifier-free guidance. In some cases, the rescaling is performed based on standard deviation based normalization. In some cases, rescaling the normalized output generates a rescaled output. Further details regarding operation 1010 are provided with reference to FIG. 6.

At operation 1015, the system generates, using the image generation model, a synthetic image based on the normalized output, where the synthetic image includes the scene of the input image and the target element of the input prompt, and where the target element is harmonized with the scene. In some cases, the operations of this step refer to, or may be performed by, an image generation model as described with reference to FIGS. 4 and 6.

In some cases, the image generation model generates the synthetic image based on the rescaled output. For example, the image generation model generates the image via a reverse diffusion process using the channel shift as described with reference to FIGS. 5-6. In some examples, the image generation model performs a normalization following the channel shift to ensure that the predicted noise after CFG in within an expected distribution. In some cases, the synthetic image is generated using multiple iterations of the image generation model (e.g., multiple forward passes of a reverse diffusion process described with reference to FIGS. 5-6). In some cases, the image processing apparatus provides the synthetic image, a high-resolution image to the user via the user interface.

According to an embodiment, the harmonized element in an image refers to an element that is consistent in certain aspects with the remaining aspects of the image. For example, the element is considered harmonized when the element is consistent in lighting, consistent in pose, consistent in orientation, consistent in size, consistent in relationship with the remaining image. However, embodiments are not limited thereto, and harmonization of an element in an image may include any other aspect that makes an element in sync with the image. In some examples, an element is considered harmonized in an image when the element blends seamlessly with the surrounding elements in terms of visual characteristics such as color, lighting, texture, etc. The process of harmonization ensures that the added or altered element appears as a natural part of the image rather than standing out as an incongruent element.

Accordingly, one or more aspects of the method include obtaining an input image and an input prompt, wherein the input image depicts a scene and the input prompt indicates a target element to be added to the scene; generating, using an image generation model, a normalized output based on the input image and the input prompt by performing a channel shift on a preliminary output of the image generation model; and generating, using the image generation model, a synthetic image based on the normalized output, wherein the synthetic image includes the scene of the input image and the target element of the input prompt, and wherein the target element is harmonized with the scene.

Some examples of the method, apparatus, and non-transitory computer readable medium further include encoding the input prompt to obtain a text embedding, wherein the preliminary output is generated based on the text embedding.

Some examples of the method, apparatus, and non-transitory computer readable medium further include generating the preliminary output based on the input prompt. Some examples further include computing a mean value based on the input image. Some examples further include subtracting the mean value from the preliminary output.

Some examples of the method, apparatus, and non-transitory computer readable medium further include obtaining a noise map. Some examples further include denoising the noise map to obtain the preliminary output.

Some examples of the method, apparatus, and non-transitory computer readable medium further include obtaining a mask indicating a location of the target element, wherein the mean value is computed based on the mask.

Some examples of the method, apparatus, and non-transitory computer readable medium further include rescaling the normalized output to obtain rescaled output, wherein the synthetic image is generated based on the rescaled output.

Some examples of the method, apparatus, and non-transitory computer readable medium further include computing a standard deviation based on the preliminary output, wherein the normalized output is rescaled based on the standard deviation.

In some aspects, the preliminary output comprises a plurality of color channels and a plurality of non-color channels, and wherein the channel shift is performed exclusively on the plurality of color channels.

Training

Figure 11:
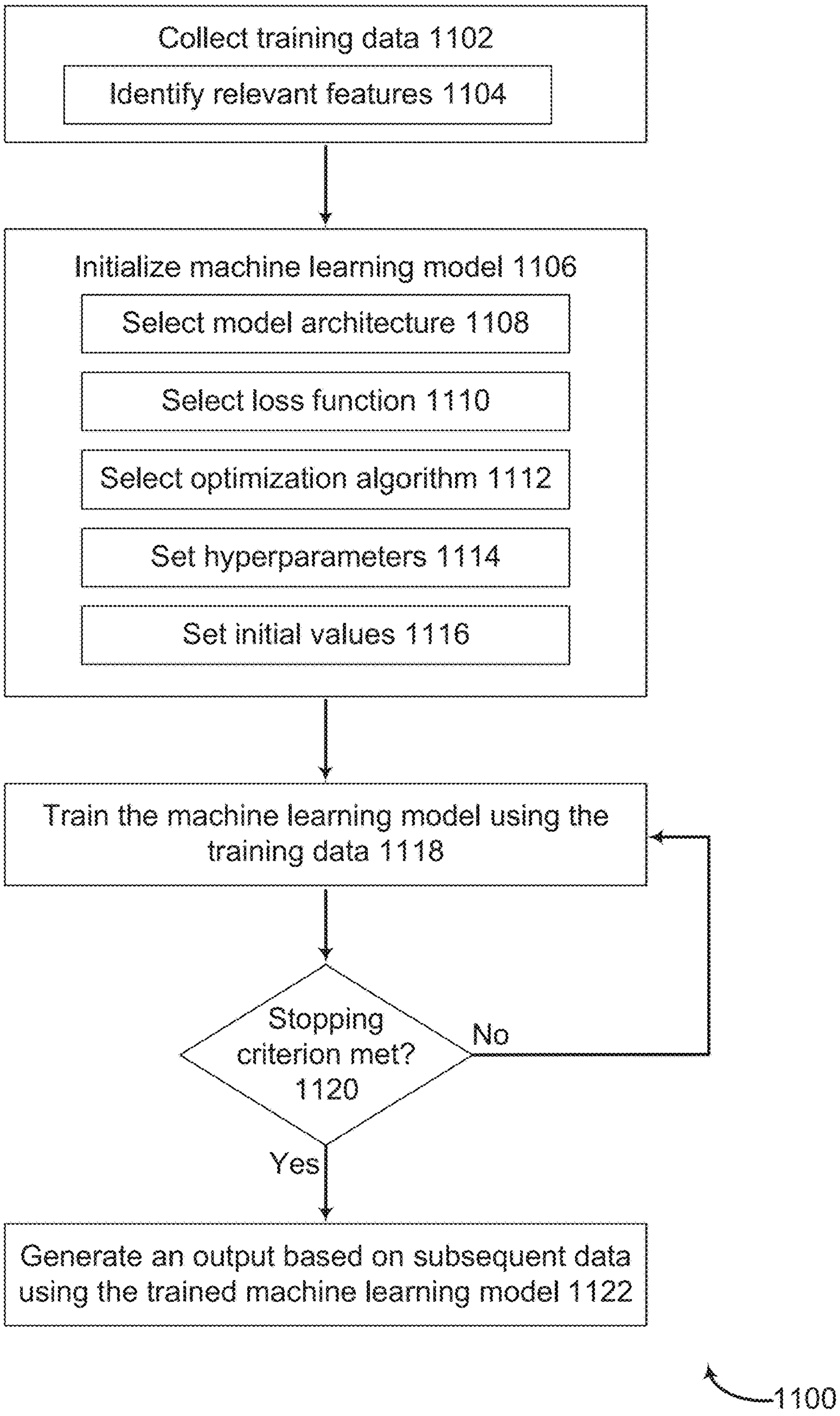
FIG. 11 shows a flow diagram depicting an algorithm as a step-by-step procedure for training a machine-learning model according to aspects of the present disclosure.

FIG. 11 is a flow diagram depicting an algorithm as a step-by-step procedure 1100 in an example implementation of operations performable for training a machine-learning model. In some embodiments, the procedure 1100 describes an operation of the training component 1425 described for configuring the image generation model 1415 as described with reference to FIG. 14. The procedure 1100 provides one or more examples of generating training data, use of the training data to train a machine-learning model, and use of the trained machine-learning model to perform a task.

To begin in this example, a machine-learning system collects training data (block 1102) that is to be used as a basis to train a machine-learning model, i.e., which defines what is being modeled. The training data is collectable by the machine-learning system from a variety of sources. Examples of training data sources include public datasets, service provider system platforms that expose application programming interfaces (e.g., social media platforms), user data collection systems (e.g., digital surveys and online crowdsourcing systems), and so forth. Training data collection may also include data augmentation and synthetic data generation techniques to expand and diversify available training data, balancing techniques to balance a number of positive and negative examples, and so forth.

The machine-learning system is also configurable to identify features that are relevant (block 1104) to a type of task, for which the machine-learning model is to be trained. Task examples include classification, natural language processing, generative artificial intelligence, recommendation engines, reinforcement learning, clustering, and so forth. To do so, the machine-learning system collects the training data based on the identified features and/or filters the training data based on the identified features after collection. The training data is then utilized to train a machine-learning model.

In order to train the machine-learning model in the illustrated example, the machine-learning model is first initialized (block 1106). Initialization of the machine-learning model includes selecting a model architecture (block 1108) to be trained. Examples of model architectures include neural networks, convolutional neural networks (CNNs), long short-term memory (LSTM) neural networks, generative adversarial networks (GANs), decision trees, support vector machines, linear regression, logistic regression, Bayesian networks, random forest learning, dimensionality reduction algorithms, boosting algorithms, deep learning neural networks, etc.

A loss function is also selected (block 1110). The loss function is utilized to measure a difference between an output of the machine-learning model (i.e., predictions) and target values (e.g., as expressed by the training data) to be used to train the machine-learning model. Additionally, an optimization algorithm is selected (1112) that is to be used in conjunction with the loss function to optimize parameters of the machine-learning model during training, examples of which include gradient descent, stochastic gradient descent (SGD), and so forth.

Initialization of the machine-learning model further includes setting initial values of the machine-learning model (block 1114) examples of which includes initializing weights and biases of nodes to improve efficiency in training and computational resources consumption as part of training. Hyperparameters are also set that are used to control training of the machine learning model, examples of which include regularization parameters, model parameters (e.g., a number of layers in a neural network), learning rate, batch sizes selected from the training data, and so on. The hyperparameters are set using a variety of techniques, including use of a randomization technique, through use of heuristics learned from other training scenarios, and so forth.

The machine-learning model is then trained using the training data (block 1118) by the machine-learning system. A machine-learning model refers to a computer representation that can be tuned (e.g., trained and retrained) based on inputs of the training data to approximate unknown functions. In particular, the term machine-learning model can include a model that utilizes algorithms (e.g., using the model architectures described above) to learn from, and make predictions on, known data by analyzing training data to learn and relearn to generate outputs that reflect patterns and attributes expressed by the training data.

Examples of training types include supervised learning that employs labeled data, unsupervised learning that involves finding an underlying structures or patterns within the training data, reinforcement learning based on optimization functions (e.g., rewards and/or penalties), use of nodes as part of "deep learning," and so forth. The machine-learning model, for instance, is configurable as including a plurality of nodes that collectively form a plurality of layers. The layers, for instance, are configurable to include an input layer, an output layer, and one or more hidden layers. Calculations are performed by the nodes within the layers through the hidden states through a system of weighted connections that are "learned" during training, e.g., through use of the selected loss function and backpropagation to optimize performance of the machine-learning model to perform an associated task.

As part of training the machine-learning model, a determination is made as to whether a stopping criterion is met (decision block 1120), i.e., which is used to validate the machine-learning model. The stopping criterion is usable to reduce overfitting of the machine-learning model, reduce computational resource consumption, and promote an ability of the machine-learning model to address previously unseen data, i.e., that is not included specifically as an example in the training data. Examples of a stopping criterion include but are not limited to a predefined number of epochs, validation loss stabilization, achievement of a performance improvement threshold, whether a threshold level of accuracy has been met, or based on performance metrics such as precision and recall. If the stopping criterion has not been met ("no" from decision block 1120), the procedure 1100 continues training of the machine-learning model using the training data (block 1118) in this example.

If the stopping criterion is met ("yes" from decision block 1120), the trained machine-learning model is then utilized to generate an output based on subsequent data (block 1122). The trained machine-learning model, for instance, is trained to perform a task as described above and therefore once trained is configured to perform that task based on subsequent data received as an input and processed by the machine-learning model.

Figure 12:
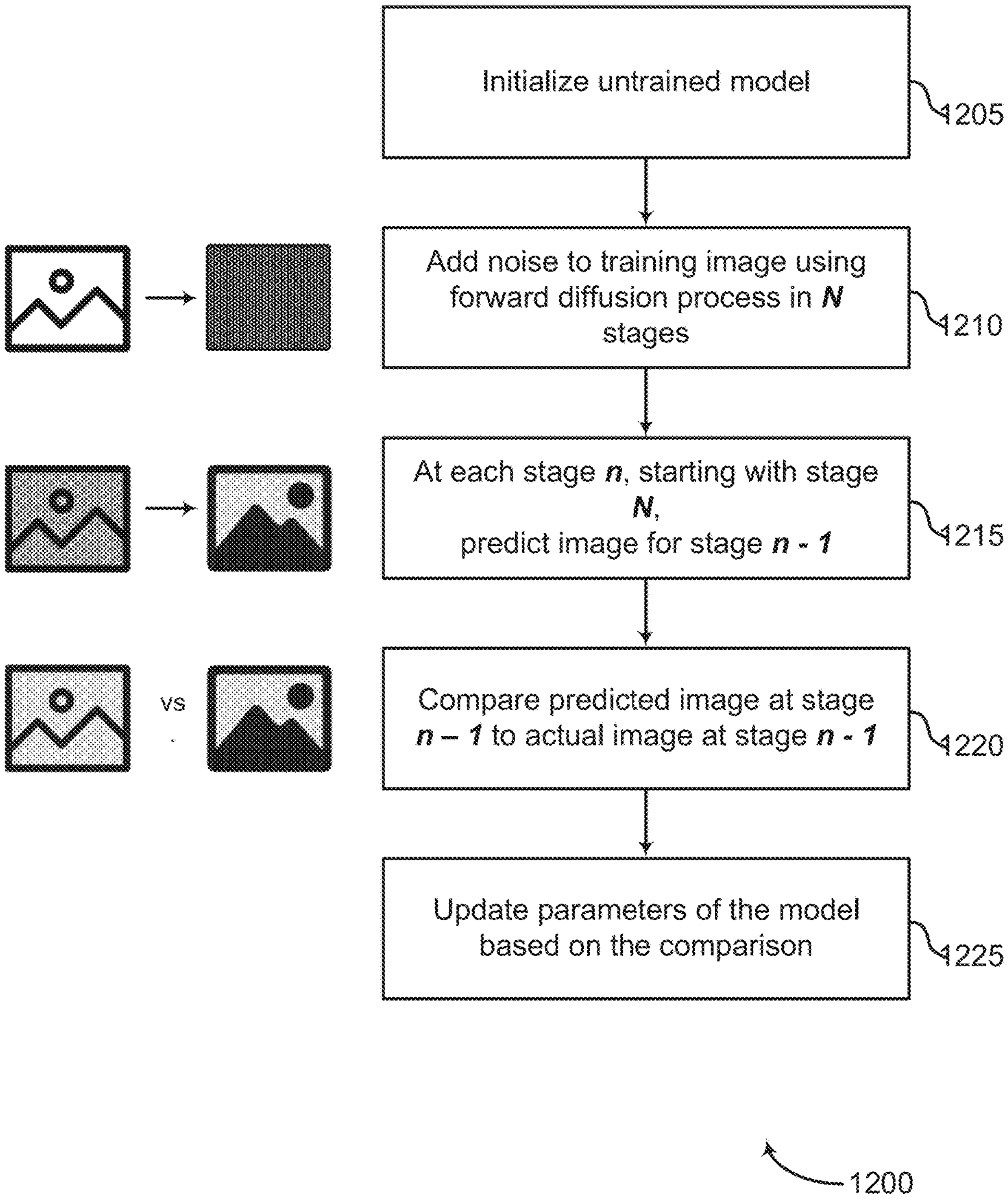
FIG. 12 shows an example of training a diffusion model according to aspects of the present disclosure.

FIG. 12 shows an example of a method of training a diffusion model 1200 according to aspects of the present disclosure. In some embodiments, the method 1200 describes an operation of the training component 1425 described for configuring the image generation model 1415 as described with reference to FIG. 14. The method 1200 represents an example for training a reverse diffusion process as described above with reference to FIG. 9. In some examples, these operations are performed by a system including a processor executing a set of codes to control functional elements of an apparatus, such as the guided diffusion model described in FIG. 5.

Additionally or alternatively, certain processes of method 1200 may be performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 12, according to some aspects, a training component (such as the training component described with reference to FIG. 4) trains a diffusion model (such as the image generation model described with reference to FIGS. 5-6) to generate an image.

At operation 1205, the user initializes an untrained model. Initialization can include defining the architecture of the model and establishing initial values for the model parameters. In some cases, the initialization can include defining hyper-parameters such as the number of layers, the resolution and channels of each layer blocks, the location of skip connections, and the like.

At operation 1210, the system adds noise to a training image (or an additional training image) using a forward diffusion process (such as the forward diffusion process described with reference to FIG. 5) in N stages. In some cases, the operations of this step refer to, or may be performed by, a training component as described with reference to FIG. 4.

At operation 1215, the system at each stage n, starting with stage N, a reverse diffusion process is used to predict the output or features at stage n−1. For example, the reverse diffusion process can predict the noise that was added by the forward diffusion process, and the predicted noise can be removed from the noise input to obtain the predicted output. In some cases, an original media item is predicted at each stage of the training process.

At operation 1220, the system compares predicted output (or features) at stage n−1 to an actual media item (or features), such as the output at stage n−1 or the original input. For example, given observed data x, the diffusion model may be trained to minimize the variational upper bound of the negative log-likelihood $-\log p_\theta(x)$ of the training data.

At operation 1225, the system updates parameters of the model based on the comparison. For example, parameters of a U-Net may be updated using gradient descent. Time-dependent parameters of the Gaussian transitions can also be learned.

Additionally, embodiments of the present disclosure are configured to describe a method for image processing. One or more aspects of the method include obtaining an input image and an input prompt; generating a preliminary output based on the input prompt; computing a mean value based on the input image; generating a normalized output by performing a channel shift on the preliminary output based on the mean value; and generating a synthetic image based on the normalized output.

Some examples of the method, apparatus, and non-transitory computer readable medium further include obtaining a noise map. Some examples further include iteratively removing noise from the noise map.

Some examples of the method, apparatus, and non-transitory computer readable medium further include encoding the input prompt to obtain a text embedding, wherein the preliminary output is generated based on the text embedding.

Some examples of the method, apparatus, and non-transitory computer readable medium further include generating the preliminary output based on the input prompt. Some examples further include computing the mean value based on the input image. Some examples further include subtracting the mean value from the preliminary output.

Some examples of the method, apparatus, and non-transitory computer readable medium further include obtaining a mask indicating a location of the target element, wherein the mean value is computed based on the mask.

Some examples of the method, apparatus, and non-transitory computer readable medium further include rescaling the normalized output to obtain rescaled output, wherein the synthetic image is generated based on the rescaled output.

Some examples of the method, apparatus, and non-transitory computer readable medium further include computing a standard deviation based on the preliminary output, wherein the normalized output is rescaled based on the standard deviation.

Figure 13:
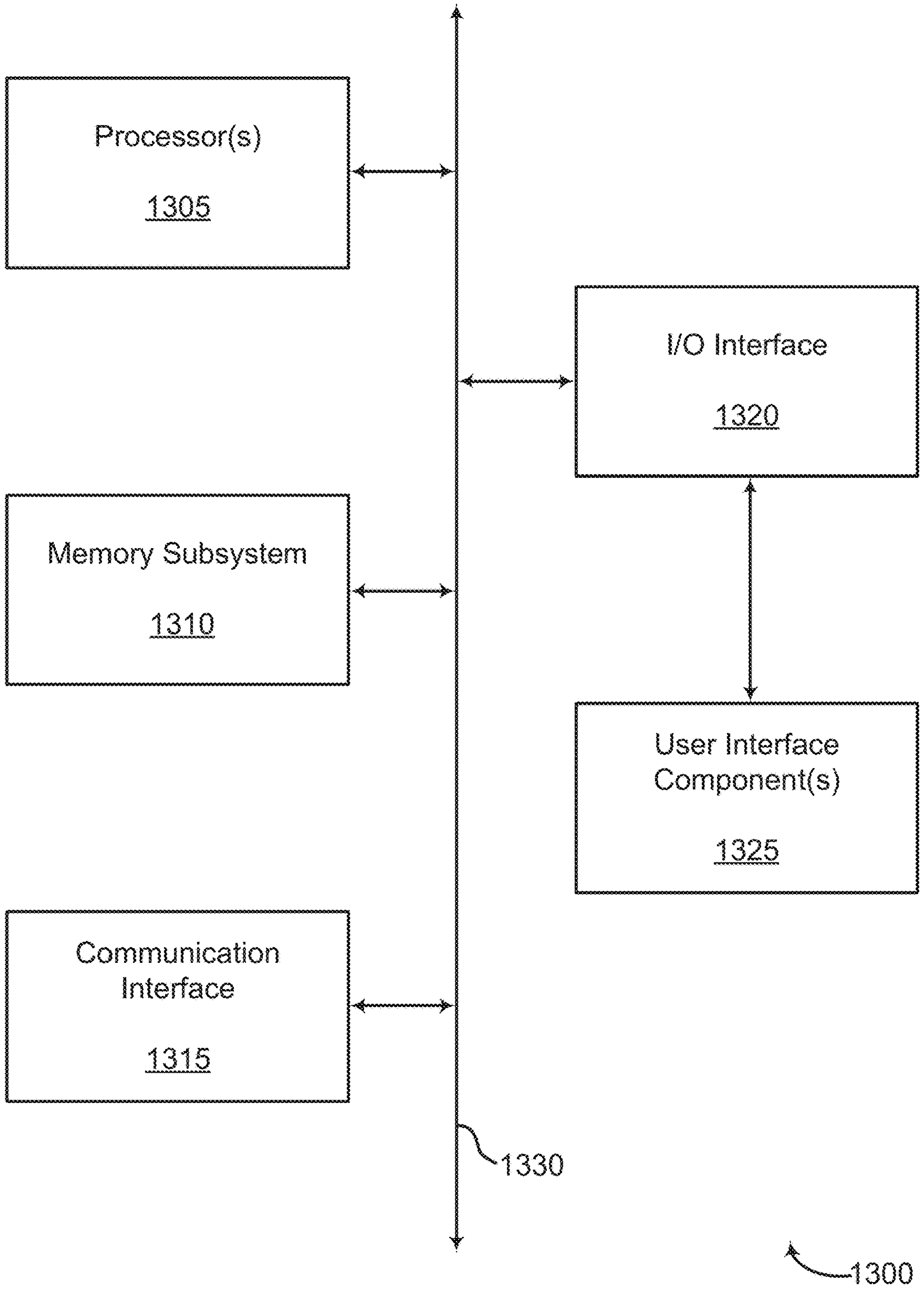
FIG. 13 shows an example of a computing device according to aspects of the present disclosure.

FIG. 13 shows an example of a computing device 1300 according to aspects of the present disclosure. According to some aspects, computing device 1300 includes processor 1305, memory subsystem 1310, communication interface 1315, I/O interface 1320, user interface component 1325, and channel 1330.

In some embodiments, computing device 1300 is an example of, or includes aspects of, the image processing apparatus described with reference to FIG. 4. In some embodiments, computing device 1300 includes one or more processors 1305 that can execute instructions stored in memory subsystem 1310 to obtain an input image and an input prompt, wherein the input image depicts a scene and the input prompt indicates a target element to be added to the scene; generate, using an image generation model, a normalized output based on the input image and the input prompt by performing a channel shift on a preliminary output of the image generation model; and generate, using the image generation model, a synthetic image based on the normalized output, wherein the synthetic image includes the scene of the input image and the target element of the input prompt, and wherein the target element is harmonized with the scene.

According to some aspects, computing device 1300 includes one or more processors 1305. Processor(s) 1305 are an example of, or includes aspects of, the processor unit as described with reference to FIG. 4. In some cases, a processor is an intelligent hardware device, (e.g., a general-purpose processing component, a digital signal processor (DSP), a central processing unit (CPU), a graphics processing unit (GPU), a microcontroller, an application-specific integrated circuit (ASIC), a field programmable gate array (FPGA), a programmable logic device, a discrete gate or transistor logic component, a discrete hardware component, or a combination thereof.

In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special-purpose components for modem processing, baseband processing, digital signal processing, or transmission processing.

According to some aspects, memory subsystem 1310 includes one or more memory devices. Memory subsystem 1310 is an example of, or includes aspects of, the memory unit as described with reference to FIG. 4. Examples of a memory device include random access memory (RAM), read-only memory (ROM), or a hard disk. Examples of memory devices include solid-state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operations such as the interaction with peripheral components or devices. In some cases, a memory controller operates memory cells. For example, the memory controller can include a row decoder, column decoder, or both. In some cases, memory cells within a memory store information in the form of a logical state.

According to some aspects, communication interface 1315 operates at a boundary between communicating entities (such as computing device 1300, one or more user devices, a cloud, and one or more databases) and channel 1330 and can record and process communications. In some cases, communication interface 1315 is provided to enable a processing system coupled to a transceiver (e.g., a transmitter and/or a receiver). In some examples, the transceiver is configured to transmit (or send) and receive signals for a communications device via an antenna.

According to some aspects, I/O interface 1320 is controlled by an I/O controller to manage input and output signals for computing device 1300. In some cases, I/O interface 1320 manages peripherals not integrated into computing device 1300. In some cases, I/O interface 1320 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 1320 or via hardware components controlled by the I/O controller.

According to some aspects, user interface component(s) 1325 enable a user to interact with computing device 1300. In some cases, user interface component(s) 1325 include an audio device, such as an external speaker system, an external display device such as a display screen, an input device (e.g., a remote-control device interfaced with a user interface directly or through the I/O controller), or a combination thereof. In some cases, user interface component(s) 1325 include a GUI.

Figure 14:
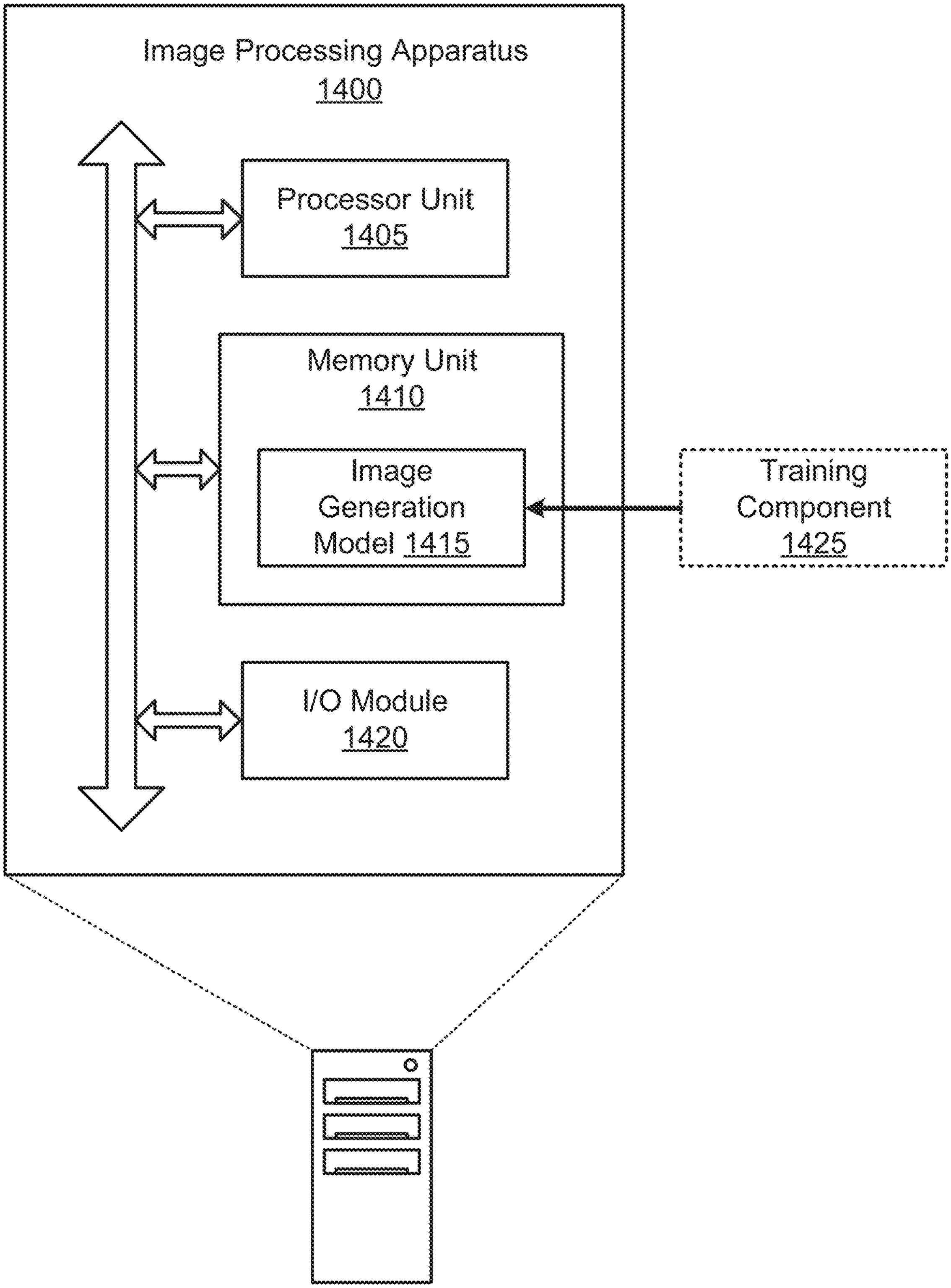
FIG. 14 shows an example of an image processing apparatus according to aspects of the present disclosure.

FIG. 14 shows an example of an image generation apparatus 1400 according to aspects of the present disclosure. Image generation apparatus 1400 may include an example of, or aspects of, the guided diffusion model described with reference to FIG. 5 and the U-Net described with reference to FIG. 7. In some embodiments, image generation apparatus 1400 includes processor unit 1405, memory unit 1410, image generation model 1415, I/O module 1420, and training component 1425. Training component 1425 updates parameters of the image generation model 1415 stored in memory unit 1410. In some examples, the training component 1425 is located outside the image generation apparatus 1400.

Processor unit 1405 includes one or more processors. A processor is an intelligent hardware device, such as a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof.

In some cases, processor unit 1405 is configured to operate a memory array using a memory controller. In other cases, a memory controller is integrated into processor unit 1405. In some cases, processor unit 1405 is configured to execute computer-readable instructions stored in memory unit 1410 to perform various functions. In some aspects, processor unit 1405 includes special purpose components for modem processing, baseband processing, digital signal processing, or transmission processing. According to some aspects, processor unit 1405 comprises one or more processors described with reference to FIG. 13.

Memory unit 1410 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause at least one processor of processor unit 1405 to perform various functions described herein.

In some cases, memory unit 1410 includes a basic input/output system (BIOS) that controls basic hardware or software operations, such as an interaction with peripheral components or devices. In some cases, memory unit 1410 includes a memory controller that operates memory cells of memory unit 1410. For example, the memory controller may include a row decoder, column decoder, or both. In some cases, memory cells within memory unit 1410 store information in the form of a logical state. According to some aspects, memory unit 1410 is an example of the memory subsystem 1310 described with reference to FIG. 13.

According to some aspects, image generation apparatus 1400 uses one or more processors of processor unit 1405 to execute instructions stored in memory unit 1410 to perform functions described herein. For example, the image generation apparatus 1400 may obtain an input image and an input prompt; generate a normalized output based on the input image and the input prompt by performing a channel shift on a preliminary output of the image generation model; and generate a synthetic image based on the normalized output, wherein the synthetic image includes the scene of the input image and the target element of the input prompt, and wherein the target element is harmonized with the scene.

The memory unit 1410 may include an image generation model 1415 trained to obtain an input image and an input prompt; generate a normalized output based on the input image and the input prompt by performing a channel shift on a preliminary output of the image generation model; and generate a synthetic image based on the normalized output, wherein the synthetic image includes the scene of the input image and the target element of the input prompt, and wherein the target element is harmonized with the scene. For example, after training, the image generation model 1415 may perform inferencing operations as described with reference to FIG. 5-6 to obtain an input image and an input prompt; generate a normalized output based on the input image and the input prompt by performing a channel shift on a preliminary output of the image generation model; and generate a synthetic image based on the normalized output, wherein the synthetic image includes the scene of the input image and the target element of the input prompt, and wherein the target element is harmonized with the scene.

In some embodiments, the image generation model 1415 is an Artificial neural network (ANN) such as the guided diffusion model described with reference to FIG. 5-6. An ANN can be a hardware component or a software component that includes connected nodes (i.e., artificial neurons) that loosely correspond to the neurons in a human brain. Each connection, or edge, transmits a signal from one node to another (like the physical synapses in a brain). When a node receives a signal, it processes the signal and then transmits the processed signal to other connected nodes.

ANNs have numerous parameters, including weights and biases associated with each neuron in the network, which control the degree of connection between neurons and influence the neural network's ability to capture complex patterns in data. These parameters, also known as model parameters or model weights, are variables that determine the behavior and characteristics of a machine learning model.

In some cases, the signals between nodes comprise real numbers, and the output of each node is computed by a function of its inputs. For example, nodes may determine their output using other mathematical algorithms, such as selecting the max from the inputs as the output, or any other suitable algorithm for activating the node. Each node and edge are associated with one or more node weights that determine how the signal is processed and transmitted. In some cases, nodes have a threshold below which a signal is not transmitted at all. In some examples, the nodes are aggregated into layers.

The parameters of image generation model 1415 can be organized into layers. Different layers perform different transformations on their inputs. The initial layer is known as the input layer and the last layer is known as the output layer. In some cases, signals traverse certain layers multiple times. A hidden (or intermediate) layer includes hidden nodes and is located between an input layer and an output layer. Hidden layers perform nonlinear transformations of inputs entered into the network. Each hidden layer is trained to produce a defined output that contributes to a joint output of the output layer of the ANN. Hidden representations are machine-readable data representations of an input that are learned from hidden layers of the ANN and are produced by the output layer. As the understanding of the ANN of the input improves as the ANN is trained, the hidden representation is progressively differentiated from earlier iterations.

Training component 1425 may train the image generation model 1415. For example, parameters of the image generation model 1415 can be learned or estimated from training data and then used to make predictions or perform tasks based on learned patterns and relationships in the data. In some examples, the parameters are adjusted during the training process to minimize a loss function or maximize a performance metric (e.g., as described with reference to FIGS. 5 and 6). The goal of the training process may be to find optimal values for the parameters that allow the machine learning model to make accurate predictions or perform well on the given task.

Accordingly, the node weights can be adjusted to improve the accuracy of the output (i.e., by minimizing a loss which corresponds in some way to the difference between the current result and the target result). The weight of an edge increases or decreases the strength of the signal transmitted between nodes. For example, during the training process, an algorithm adjusts machine learning parameters to minimize an error or loss between predicted outputs and actual targets according to optimization techniques like gradient descent, stochastic gradient descent, or other optimization algorithms. Once the machine learning parameters are learned from the training data, the image generation model 1415 can be used to make predictions on new, unseen data (i.e., during inference).

I/O module 1420 receives inputs from and transmits outputs of the image processing apparatus 1400 to other devices or users. For example, I/O module 1420 receives inputs for the image generation model 1415 and transmits outputs of the image generation model 1415. According to some aspects, I/O module 1420 is an example of the I/O interface 1320 described with reference to FIG. 13.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word “or” indicates an inclusive list such that, for example, the list of X, Y, or Z means X or Y or Z or XY or XZ or YZ or XYZ. Also the phrase “based on” is not used to represent a closed set of conditions. For example, a step that is described as “based on condition A” may be based on both condition A and condition B. In other words, the phrase “based on” shall be construed to mean “based at least in part on.” Also, the words “a” or “an” indicate “at least one.”

What is claimed is:

1. A method for image processing, comprising:
- obtaining an input image and an input prompt, wherein the input image depicts a scene and the input prompt indicates a target element to be added to the scene;
- generating, using an image generation model, a normalized output based on the input image and the input prompt by computing a first statistical value based on a conditional output, computing a second statistical value based on a guided output of a classifier free guidance operation, and performing a channel shift on the guided output of the image generation model based on the first statistical value and the second statistical value; and
- generating, using the image generation model, a synthetic image based on the normalized output by performing inpainting on the scene of the input image to include the target element of the input prompt, and wherein the target element is harmonized with the scene.

2. The method of claim 1, further comprising:
- encoding the input prompt to obtain a text embedding, wherein the guided output is generated based on the text embedding.

3. The method of claim 1, wherein generating the normalized output comprises:
- generating the guided output based on the input prompt;
- computing a mean value based on the input image; and
- subtracting the mean value from the guided output.

4. The method of claim 3, further comprising:
- obtaining a noise map; and
- denoising the noise map to obtain the guided output.

5. The method of claim 3, further comprising:
- obtaining a mask indicating a location of the target element, wherein the mean value is computed based on the mask.

6. The method of claim 1, further comprising:
- rescaling the normalized output to obtain rescaled output, wherein the synthetic image is generated based on the rescaled output.

7. The method of claim 6, further comprising:
- computing a standard deviation based on the guided output, wherein the normalized output is rescaled based on the standard deviation.

8. The method of claim 1, wherein:
- the guided output comprises a plurality of color channels and a plurality of non-color channels, and wherein the channel shift is performed exclusively on the plurality of color channels.

9. A non-transitory computer readable medium storing code for image processing, the code comprising instructions executable by a processor to:
- obtain an input image and an input prompt;
- generate a preliminary output based on the input prompt;
- compute a mean value based on the input image;
- generate a normalized output based on the input image and the input prompt by computing a first statistical value based on a conditional output, computing a second statistical value based on a guided output of a classifier free guidance operation, and performing a channel shift on the guided output based on the mean value; and
- generate a synthetic image based on the normalized output by performing inpainting on a scene of the input image to include a target element of the input prompt, and wherein the target element is harmonized with the scene.

10. The non-transitory computer readable medium of claim 9, the code further comprising instructions executable by the processor to:
- obtain a noise map; and
- iteratively remove noise from the noise map.

11. The non-transitory computer readable medium of claim 9, the code further comprising instructions executable by the processor to:
- encode the input prompt to obtain a text embedding, wherein the preliminary output is generated based on the text embedding.

12. The non-transitory computer readable medium of claim 9, the code further comprising instructions executable by the processor to:
- generate the preliminary output based on the input prompt;
- compute the mean value based on the input image; and
- subtract the mean value from the preliminary output.

13. The non-transitory computer readable medium of claim 9, the code further comprising instructions executable by the processor to:

obtain a mask indicating a location of the target element, wherein the mean value is computed based on the mask.

14. The non-transitory computer readable medium of claim 9, the code further comprising instructions executable by the processor to:

rescale the normalized output to obtain rescaled output, wherein the synthetic image is generated based on the rescaled output.

15. The non-transitory computer readable medium of claim 14, the code further comprising instructions executable by the processor to:

compute a standard deviation based on the preliminary output, wherein the normalized output is rescaled based on the standard deviation.

16. An apparatus for image processing, comprising:

at least one processor;

at least one memory component coupled with the at least one processor; and an image generation model comprising parameters stored in the at least one memory component and trained to generate a normalized output based on an input image and an input prompt by computing a first statistical value based on a conditional output, computing a second statistical value based on a guided output of a classifier free guidance operation, and performing a channel shift on the guided output and to generate a synthetic image based on the normalized output by performing inpainting on a scene of the input image to include a target element of the input prompt, and wherein the target element is harmonized with the scene.

17. The apparatus of claim 16, further comprising:

a text encoder configured to encode the input prompt to obtain a text embedding, wherein the guided output is generated based on the text embedding.

18. The apparatus of claim 16, further comprising:

a mask generator configured to generate a mask indicating a location of the target element, wherein a mean value is computed based on the mask.

19. The apparatus of claim 16, wherein:

the image generation model comprises a diffusion model.

20. The apparatus of claim 16, further comprising:

an image editing application comprising a user interface configured to obtain the input image and the input prompt.

* * * * *